United States Patent
Akao

(10) Patent No.: US 12,182,932 B2
(45) Date of Patent: Dec. 31, 2024

(54) INFORMATION PROCESSING DEVICE, INFORMATION PROCESSING METHOD, AND INFORMATION PROCESSING PROGRAM FOR SPECIFYING OBJECT LIGHT IN STEPWISE MANNER AND WAVE MODIFYING

(71) Applicant: SONY GROUP CORPORATION, Tokyo (JP)

(72) Inventor: Masato Akao, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 160 days.

(21) Appl. No.: 17/795,424

(22) PCT Filed: Mar. 5, 2021

(86) PCT No.: PCT/JP2021/008839
§ 371 (c)(1),
(2) Date: Jul. 26, 2022

(87) PCT Pub. No.: WO2021/182361
PCT Pub. Date: Sep. 16, 2021

(65) Prior Publication Data
US 2023/0089872 A1    Mar. 23, 2023

(30) Foreign Application Priority Data
Mar. 13, 2020 (JP) .................. 2020-043718

(51) Int. Cl.
*G06T 15/40* (2011.01)

(52) U.S. Cl.
CPC .................. *G06T 15/40* (2013.01)

(58) Field of Classification Search
CPC ............ G06T 15/40; G06T 15/50; G03H 1/08
See application file for complete search history.

(56) References Cited

FOREIGN PATENT DOCUMENTS

| JP | H11-003128 A | 1/1999 |
|---|---|---|
| JP | 2009-288575 A | 12/2009 |

OTHER PUBLICATIONS

Matsushima, Kyoji. "Exact hidden-surface removal in digitally synthetic full-parallax holograms." Practical Holography XIX: Materials and Applications. vol. 5742. SPIE, 2005. (Year: 2005).*
Kong, Dezhao, et al. "Three-dimensional information hierarchical encryption based on computer-generated holograms." Optics Communications 380 (2016): 387-393. (Year: 2016).*

(Continued)

*Primary Examiner* — Daniel F Hajnik
(74) *Attorney, Agent, or Firm* — Paratus Law Group, PLLC

(57) ABSTRACT

An information processing device (20) includes: a specifying unit (23A) that specifies, from a plurality of pieces of layer data capable of expressing object light of a three-dimensional object in a stepwise manner, an occlusion region that is lost due to a foreground image of layer data of another hierarchy; and a modifying unit (23B) that modifies at least one of an amplitude or a phase in layer data at a boundary with the occlusion region that has been specified so that leakage of the object light to the outside of the occlusion region is suppressed.

7 Claims, 16 Drawing Sheets

(56) References Cited

OTHER PUBLICATIONS

Chen, Rick H-Y., and Timothy D. Wilkinson. "Computer generated hologram from point cloud using graphics processor." Applied optics 48.36 (2009): 6841-6850. (Year: 2009).*

Itoh, Yuta, Takumi Hamasaki, and Maki Sugimoto. "Occlusion leak compensation for optical see-through displays using a single-layer transmissive spatial light modulator." IEEE transactions on visualization and computer graphics 23.11 (2017): 2463-2473. (Year: 2017).*

Matsushima et al., Silhouette method for hidden surface removal in computer holography and its acceleration using the switch-back technique, Optics Express, Sep. 2014, pp. 24450-24465.

\* cited by examiner

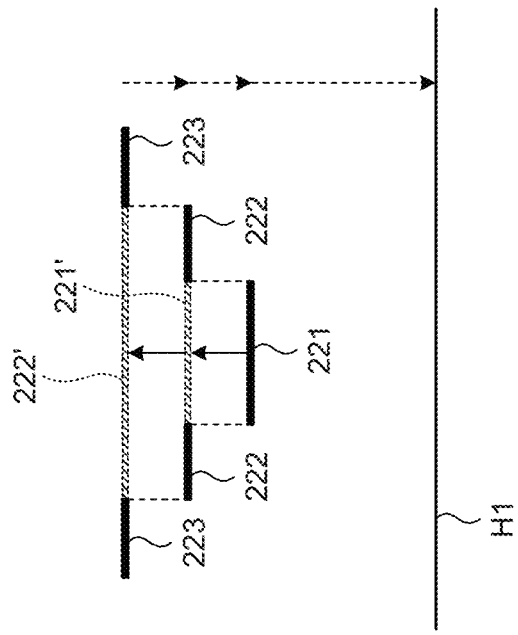
FIG.16
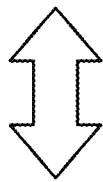
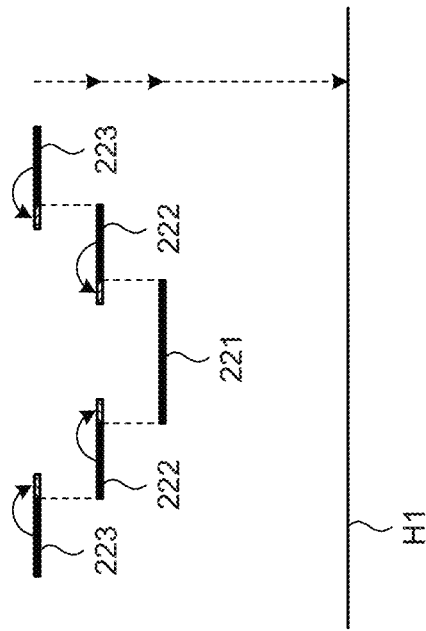

INFORMATION PROCESSING DEVICE, INFORMATION PROCESSING METHOD, AND INFORMATION PROCESSING PROGRAM FOR SPECIFYING OBJECT LIGHT IN STEPWISE MANNER AND WAVE MODIFYING

CROSS REFERENCE TO PRIOR APPLICATION

This application is a National Stage Patent Application of PCT International Patent Application No. PCT/JP2021/008839 (filed on Mar. 5, 2021) under 35 U.S.C. § 371, which claims priority to Japanese Patent Application No. 2020-043718 (filed on Mar. 13, 2020), which are all hereby incorporated by reference in their entirety.

FIELD

The present disclosure relates to an information processing device, an information processing method, and an information processing program.

BACKGROUND

Hologram display devices calculate a hologram by performing hidden surface removal processing for a three-dimensional object to be reproduced and displayed and reproduce the three-dimensional object by irradiating the hologram with a reference wave. The hidden surface removal processing is processing of removing a wavefront generated from a back surface of an object, that is, a surface that is not visually recognized from the viewpoint, and allowing only the wavefront generated from the surface of the object to be visually recognized from the viewpoint. For example, Patent Literature 1 discloses technology of obtaining hologram data of an object image expressed in a coordinate system in a real space by performing, by a hidden surface removal means, hidden surface removal on the basis of a distance between each point on the object image expressed in a screen coordinate system and the viewpoint and performing inverse perspective transformation on the object image on the screen coordinate system that has been subjected to the hidden surface removal.

CITATION LIST

Patent Literature

Patent Literature 1: Japanese Unexamined Patent Publication No. H11-3128

SUMMARY

Technical Problem

In the related art described above, in a case where a hologram having a foreground and a background is reproduced, ringing occurs due to leakage of a wavefront from between the foreground and the background, and thus there is a demand for suppressing the occurrence of ringing.

Therefore, the present disclosure proposes an information processing device, an information processing method, and an information processing program capable of suppressing occurrence of ringing in a hologram having an anteroposterior relationship of objects.

Solution to Problem

To solve the problems described above, an information processing device according to an embodiment of the present disclosure includes: a specifying unit that specifies, from a plurality of pieces of layer data capable of expressing object light of a three-dimensional object in a stepwise manner, an occlusion region that is lost due to a foreground image of one of the plurality of pieces of layer data of another hierarchy; and a modifying unit that modifies at least one of an amplitude or a phase in one of the plurality of pieces of layer data at a boundary with the occlusion region that has been specified so that leakage of the object light to an outside of the occlusion region is suppressed.

Moreover, an information processing method according to an embodiment of the present disclosure includes the steps of: by a computer, specifying, from a plurality of pieces of layer data capable of expressing object light of a three-dimensional object in a stepwise manner, an occlusion region that is lost due to a foreground image of one of the plurality of pieces of layer data of another hierarchy; and modifying at least one of an amplitude or a phase in one of the plurality of pieces of layer data at a boundary with the occlusion region that has been specified so that leakage of the object light to an outside of the occlusion region is suppressed.

Moreover, an information processing program according to an embodiment of the present disclosure causes a computer to execute the steps of: specifying, from a plurality of pieces of layer data capable of expressing object light of a three-dimensional object in a stepwise manner, an occlusion region that is lost due to a foreground image of one of the plurality of pieces of layer data of another hierarchy; and modifying at least one of an amplitude or a phase in one of the plurality of pieces of layer data at a boundary with the occlusion region that has been specified so that leakage of the object light to an outside of the occlusion region is suppressed.

BRIEF DESCRIPTION OF DRAWINGS

FIG. 16 is a diagram for explaining an example of countermeasure (3-2) depending on the type of an occlusion region.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

[Overview of Holograms]

A hologram is a display medium in which interference fringes, formed by causing interference between object light reflected from an object and reference light having high coherency such as a laser, are recorded. When irradiated with a light beam having the same amplitude and phase as those of the reference light, the hologram reproduces the object light by diffraction of light. The detailed principle of the hologram is described in, for example, JP 2013-54068 A.

Figure 1:
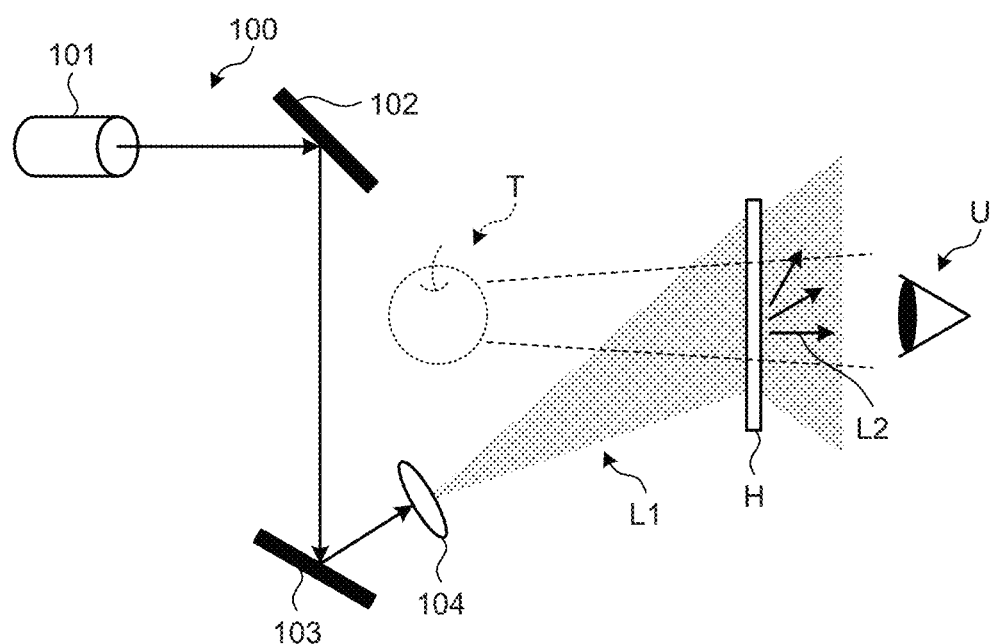
FIG. 1 is a diagram for explaining an overview of generation of a hologram according to an embodiment.

FIG. 1 is a diagram for explaining an overview of generation of a hologram according to an embodiment. In the example illustrated in FIG. 1, a hologram H (hologram data) makes it possible, as is known, to reproduce an image T of an object using a light beam L1 having the same amplitude and phase as those of reference light. The light beam L enters the hologram H via an optical system 100. The optical system 100 includes, for example, a laser light source 101, a collimator 102, a mirror 103, and a spatial filter 104. The hologram H reproduces object light L2 of the object by being irradiated with the light beam L1 of the optical system 100. A user U recognizes the image T reproducing a stereoscopic object by visually recognizing the object light L2 emitted from the hologram H.

Figure 2:
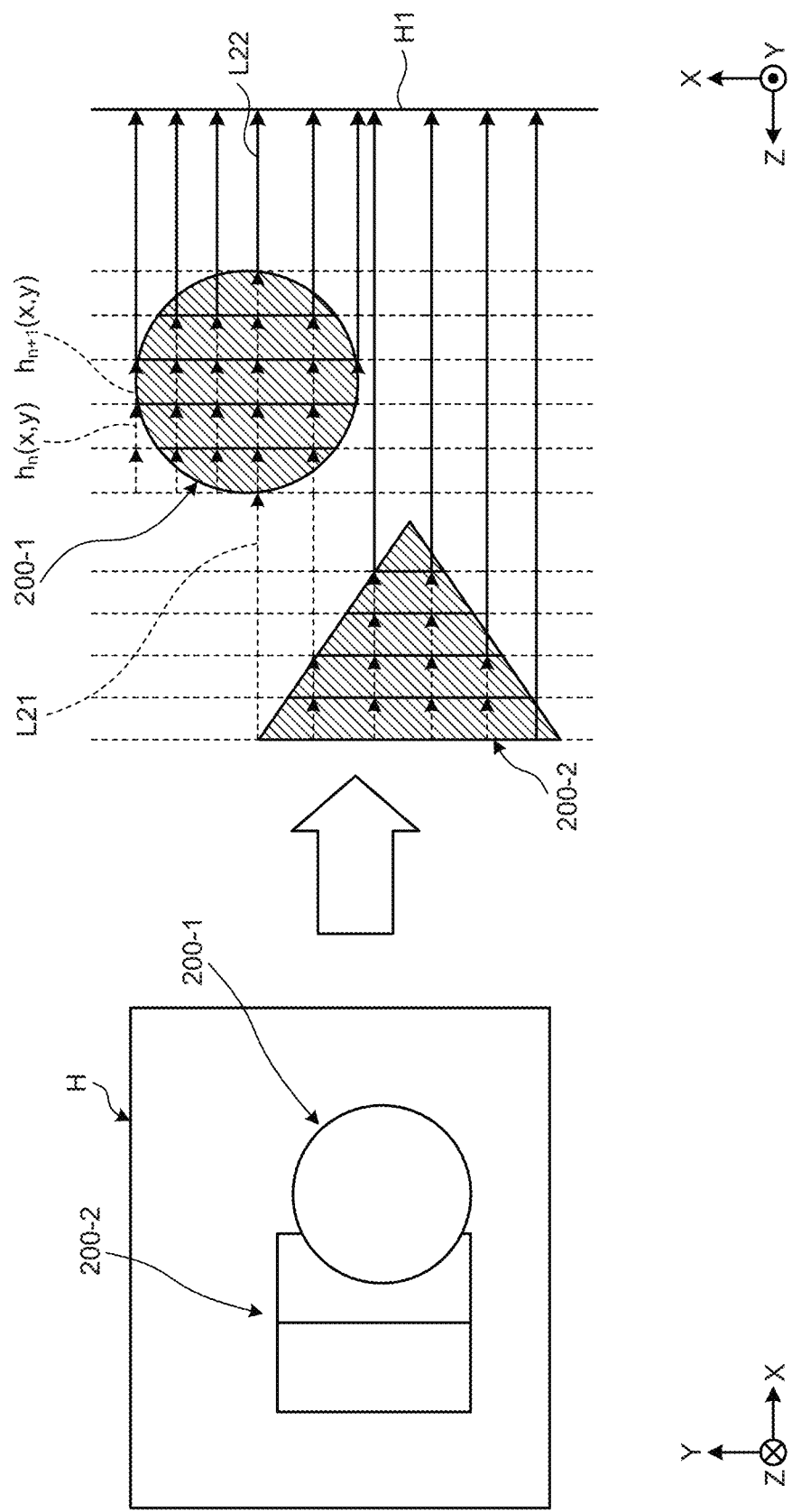
FIG. 2 is a diagram for explaining an example of hidden-surface treatment of a hologram.

For example, in the hologram H, wavefront propagation calculation is sequentially performed from the distant view to the near view. FIG. 2 is a diagram for explaining an example of hidden-surface treatment of the hologram. As illustrated in the left diagram of FIG. 2, the hologram H illustrates three-dimensional objects 200-1 and 200-2. The object 200-1 is positioned in front of the object 200-2 in the depth direction indicated by the Z axis. Referring from the XY plane, the hologram H is visually recognized with a part of the object 200-1 overlapping the object 200-2. Hereinafter, when the object 200-1 and the object 200-2 are not distinguished from each other, the object 200-1 and the object 200-2 will be referred to as "objects 200".

The right diagram of FIG. 2 illustrates the depth direction (Z-axis direction) of the left diagram of FIG. 2 from above. As illustrated in the right diagram of FIG. 2, the hologram H is wavefront-propagated in the order from a back layer to a front layer in the depth direction. Object light of the back layer blocked by the front layer is replaced with the object light of the front layer. For example, a light beam L21 of the object 200-2 is blocked by the object 200-1 and replaced with a light beam L22, which is the object light of the object 200-1. The light beam L22 of the object 200-1 reaches a hologram surface H1.

The hologram H is subjected to hidden-surface treatment for removing a portion of an object 200 not visible from the viewpoint. The hidden-surface treatment can use Equation (1) for treating the wavefront of an anterior stage and Equation (2) for treating the wavefront of the hologram surface H1. An anterior stage means a layer closer to the hologram surface H1 among layers. A posterior stage means a layer in the depth direction from an anterior stage among layers. The foremost stage means a layer closest to the hologram surface H1.

$$h_{n+1}(x,y) = P_n(m_n(x,y) \cdot h_n(x,y) + o_n(x,y)) \qquad \text{Equation (1)}$$

$$h_{hologram}(x,y) = P_N(m_N(x,y) \times h_N(x,y) + o_N(x,y)) \qquad \text{Equation (2)}$$

In Equations (1) and (2), n and N are integers, and a value increases as it approaches the hologram surface H1. $h_{n+1}(x, y)$ denotes a wavefront of an (n+1)th layer (anterior stage). $m_n(x, y)$ denotes a mask function of an nth layer (posterior stage). Where the value is "0", $m_n(x, y)$ denotes the inside of an object. Where the value is "1", $m_n(x, y)$ denotes the outside of an object. $h_n(x, y)$ denotes the wavefront of the nth layer. $P_n$ is a wavefront propagation operator. n is an integer. $o_n(x, y)$ denotes object light of the nth layer. $m_N(x, y)$ denotes a mask function of the frontmost layer. $h_N(x, y)$ is a wavefront of the frontmost layer. $P_N$ is a wavefront propagation operator. $o_N(x, y)$ denotes object light of the frontmost layer.

For example, in the hologram H illustrated in the left diagram of FIG. 2, ringing may occur in which the contour of the object 200-1, the object 200-2, or other object is visually recognized as blurred due to a background image. The ringing may occur when a wavefront leaks from the boundary portion between the foreground such as the object 200-1, the object 200-2, or other objects and the background. Therefore, the present disclosure provides an information processing device and the like capable of suppressing occurrence of ringing in the hologram H having an anteroposterior relationship of objects.

EMBODIMENTS

[Schematic Configuration of Information Processing System]

Figure 3:
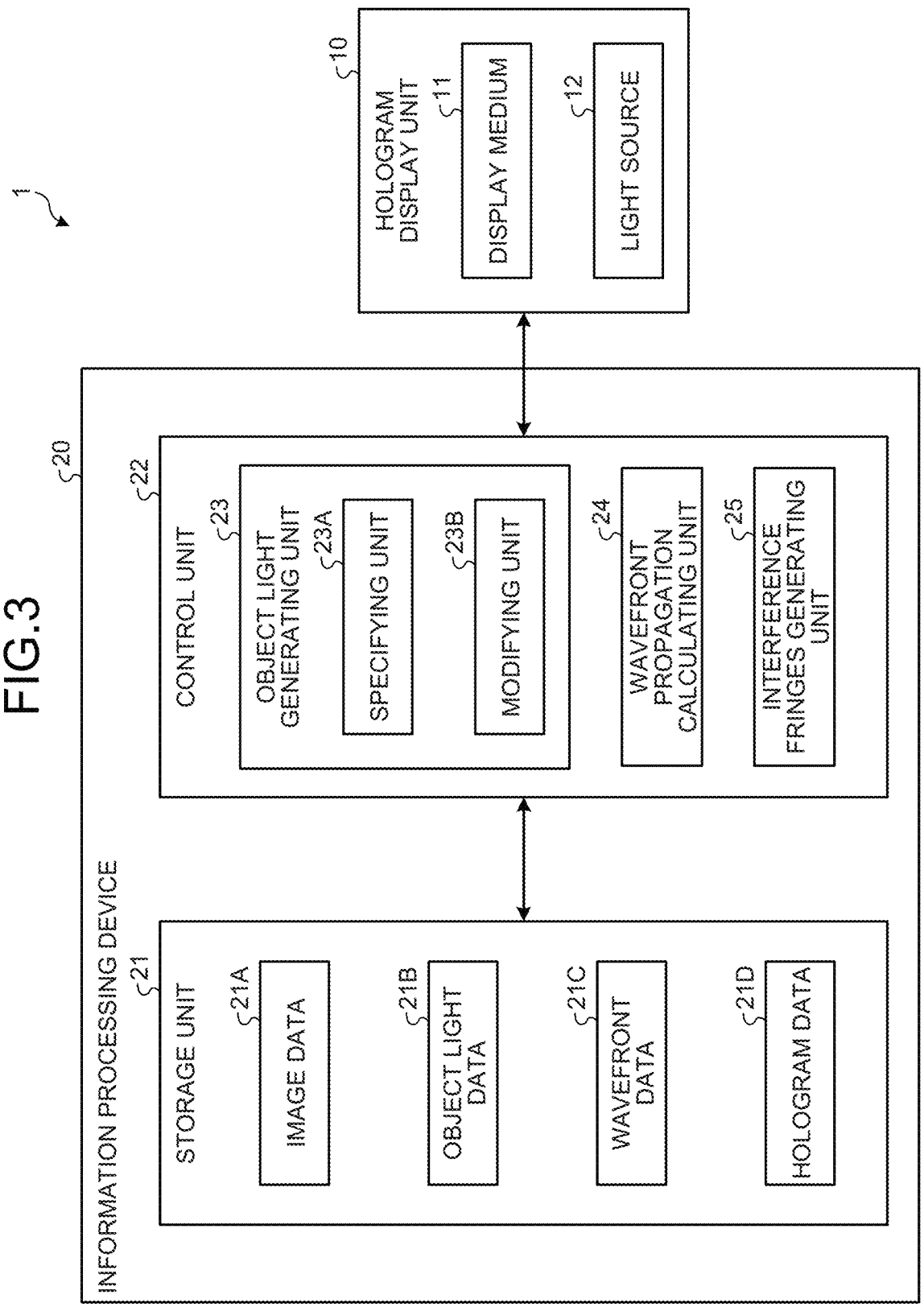
FIG. 3 is a diagram illustrating a schematic configuration of an information processing system according to an embodiment.

FIG. 3 is a diagram illustrating a schematic configuration of an information processing system according to an embodiment. An information processing system 1 illustrated in FIG. 3 reproduces the hologram H. The hologram H is, for example, hologram data generated on the basis of image data. The image data includes, for example, image information and distance information. The image information includes, for example, information indicating a two-dimensional image obtained by imaging an object by a ranging camera. The image information includes a plurality of pieces of pixel information. The pixel information includes, for example, position information, intensity information, and the like. In the present disclosure, the hologram H is generated by performing diffraction processing on the basis of each piece of pixel information of a plurality of pixels in image data.

In the example illustrated in FIG. 3, the information processing system 1 includes a hologram display unit 10 and an information processing device 20. The information processing device 20 is electrically connected with the hologram display unit 10.

The hologram display unit 10 displays the hologram H on the basis of the hologram data from the information processing device 20. The hologram display unit 10 includes a display medium 11 and a light source 12. The hologram display unit 10 may further include, for example, the optical system 100 or the like.

The display medium 11 is a medium capable of recording hologram data. The display medium 11 includes, for example, a hologram, a spatial light modulator, and others. The display medium 11 can include a function of outputting a complex amplitude distribution or the like of the hologram surface H1 represented by the hologram data to a liquid crystal display or the like as a video signal. The light source 12 emits the light beam L1 corresponding to the reference light under the control by the information processing device 20. The light source 12 includes, for example, the laser light source 101 and the like. The light beam L1 emitted by the light source 12 is applied to the display medium 11 (hologram H) via the optical system 100.

[Configuration Example of Information Processing Device]

The information processing device 20 is, for example, a dedicated or general-purpose computer. The information processing device 20 controls display of the hologram display unit 10. The information processing device 20 has a function of generating hologram data. The information processing device 20 can include an interface, a communication device, and the like for enabling transmission and reception of data with an external electronic device.

The information processing device 20 includes a storage unit 21 and a control unit 22. The control unit 22 is electrically connected with the hologram display unit 10 and the storage unit 21.

The storage unit 21 stores various types of data and programs. The storage unit 21 is implemented by, for example, a semiconductor memory element such as a RAM or a flash memory or a storage device such as a hard disk or an optical disk. The storage unit 21 stores various types of data such as image data 21A, object light data 21B, wavefront data 21C, and hologram data 21D.

The image data 21A indicates an image on which the hologram H is based. The image data 21A includes, for example, data indicating RGB, the distance, and the like. The image data 21A is acquired from an external electronic device, a server, or the like. The image data 21A may be, for example, created from three-dimensional computer graphics, however, in the present embodiment, it is based on the premise that there is no information hidden by the anteroposterior relationship of objects in the image.

The object light data 21B is, for example, data indicating object light of a three-dimensional object obtained from the image data 21A. The object light data 21B indicates, for example, light beams of different angles of objects for each of a plurality of layers. In the present embodiment, the object light data 21B is an example of layer data. The wavefront data 21C is, for example, data obtained by calculating wavefront propagation to the hologram surface H1 for each layer. The hologram data 21D is, for example, data obtained by calculating interference fringes of object light and reference light on the hologram surface H1. The hologram data 21D includes a plurality of pieces of position data corresponding to a plurality of pixels included in the hologram generation surface and at least one of phase data or amplitude data corresponding to the position data.

The control unit 22 controls the information processing device 20. The control unit 22 includes processing units such as an object light generating unit 23, a wavefront propagation calculating unit 24, and an interference fringes generating unit 25. The object light generating unit 23 includes functional units such as a specifying unit 23A and a modifying unit 23B. Each of processing units of the control unit 22, which are the object light generating unit 23, the wavefront propagation calculating unit 24, and the interference fringes generating unit 25, is implemented by, for example, a central processing unit (CPU), a micro control unit (MCU), or the like executing a program stored inside the information processing device 20 using a random access memory (RAM) or the like as a work area. Furthermore, each of the processing units may be implemented by, for example, an integrated circuit such as an application specific integrated circuit (ASIC) or a field-programmable gate array (FPGA).

The object light generating unit 23 generates the object light data 21B indicating the object light on the basis of the image data 21A. For example, the object light generating unit 23 acquires light beam information of different angles obtained from the object from a plurality of pieces of image data 21A and generates the object light data 21B for each layer. The specifying unit 23A of the object light generating unit 23 specifies an occlusion region (foreground region) that is lost by a foreground image of another piece of object light data 21B from a plurality of pieces of object light data 21B that indicates a stepwise image of the object and can express object light of the object. The modifying unit 23B of the object light generating unit 23 modifies at least one of the amplitude or the phase in object light data 21B at a boundary with the occlusion region to be specified so as to suppress the object light. The object light generating unit 23 stores the generated object light data 21B in the storage unit 21.

The wavefront propagation calculating unit 24 calculates the wavefront propagation on the basis of the amplitude, the phase, and the like of the object light data 21B. The wavefront propagation calculating unit 24 calculates the wavefront propagation by using, for example, the Rayleigh-Sommerfeld diffraction formula, an angular spectrum method, or a calculation method such as Fresnel diffraction or Fraunhofer diffraction. The wavefront propagation calculating unit 24 stores the wavefront data 21C indicating the calculation result in the storage unit 21.

The interference fringes generating unit 25 calculates interference fringes between the object light and the reference light represented by complex amplitude of the hologram surface H1 on the basis of the wavefront data 21C and generates the hologram data 21D. For example, the interference fringes generating unit 25 generates the hologram data 21D to be displayed by the display medium 11 on the basis of the calculated interference fringes. The interference fringes generating unit 25 stores the generated hologram data 21D in the storage unit 21.

The configuration example of the information processing device 20 according to the present embodiment has been described above. Note that the configuration described above by referring to FIG. 3 is merely an example, and the configuration of the information processing device 20 according to the present embodiment is not limited to such an example. The functional configuration of the information processing device 20 according to the present embodiment can be flexibly modified depending on specifications or operation.

In the present embodiment, a case where the object light generating unit 23 of the information processing device 20 includes the specifying unit 23A and the modifying unit 23B will be described, however, the present embodiment is not limited thereto. For example, the specifying unit 23A and the modifying unit 23B may be implemented by the wavefront propagation calculating unit 24 or may be implemented as an independent processing unit.

[Example of Object Light Data According to Embodiment]

Figure 4:
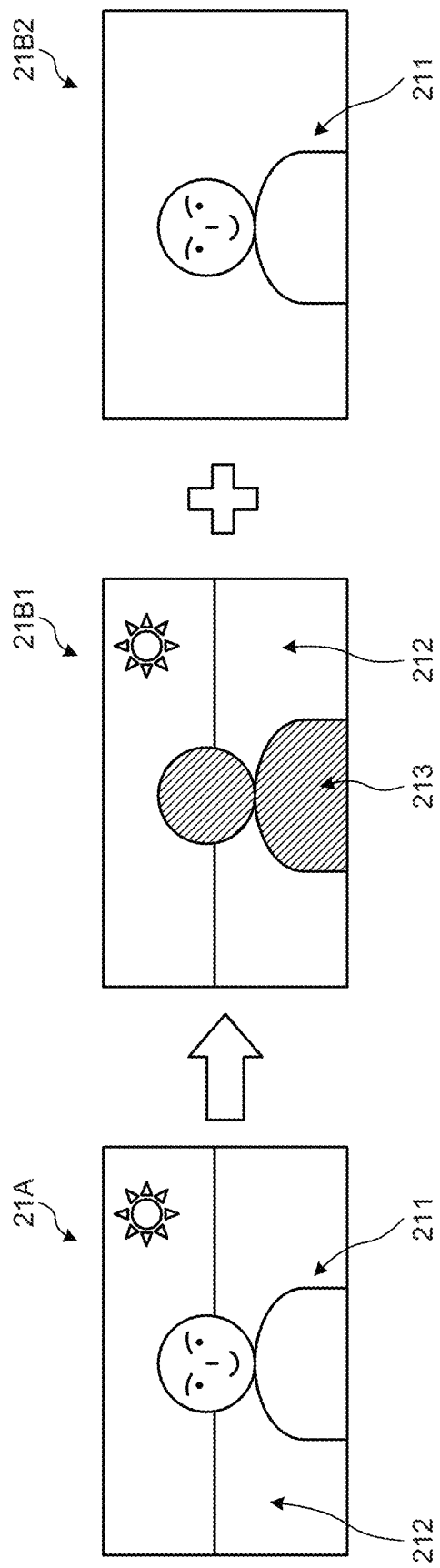
FIG. 4 is a diagram illustrating an example of a relationship between image data and object light data.

FIG. 4 is a diagram illustrating an example of a relationship between image data and object light data. The image data 21A illustrated in FIG. 4 is data indicating a two-dimensional image obtained by imaging an object. The image data 21A includes distance information. In the example illustrated in FIG. 4, the image data 21A is an image obtained by capturing a foreground 211 such as the user U and a background 212.

For example, in a three-dimensional space, in a case where there is an anteroposterior relationship between or among a plurality of objects, a state called occlusion occurs. Occlusion is a state in which an object in front hides an object behind and cannot be seen. The image data 21A is in a state where a part of the background 212 is hidden by the foreground 211 and cannot be seen. For example, in a case where the hologram data 21D has an occlusion state, a phenomenon called ringing in which a wavefront at the boundary of the occlusion region leaks out may occur. That is, the ringing includes blurry display of the boundary portion of the occlusion region. Therefore, the present disclosure provides the information processing device 20 and others capable of suppressing deterioration in visibility of a holographic projection when an occlusion state occurs.

Object light data 21B1 and object light data 21B2 are data obtained by modeling the object light for each different layer from the image data 21A. The object light data 21B1 and the object light data 21B2 are data of layers from which a light beam is sampled. The object light data 21B1 is, for example, data corresponding to a layer of the background 212 of the image data 21A. The object light data 21B2 is data corresponding to a layer of the foreground 211 of the image data 21A. In the object light data 21B1, a portion of the foreground 211 is an occlusion region 213. The occlusion region 213 includes, for example, a region in which there is no data due to objects, images, or the like of different layers. That is, the occlusion region 213 is a region having pixel values of 0. Hereinafter, in a case where the object light data 21B1 and the object light data 21B2 are not distinguished, the object light data 21B1 and the object light data 21B2 are described as "object light data 21B".

In the example illustrated in FIG. 4, in order to simplify the description, a case where the information processing device 20 presumes two layers of the background 212 and the foreground 211 of the image data 21A will be described, however, it is not limited thereto. For example, the information processing device 20 may presume a multilayer structure of three or more layers for the image data 21A. Furthermore, the information processing device 20 can use a method of generating hologram data of a computer generated hologram (CGH). As a method, for example, a point-based method can be used in which a subject space is regarded as a set of points, that is, an object is regarded as a set of point objects, and a wavefront of a point light source is added, thereby generating the hologram data 21D. As a method, for example, a method of generating the hologram data 21D by expressing an object with a polygon and adding a wavefront of a point light source can be used.

[Processing Procedure of Information Processing Device According to Embodiment]

Figure 5:
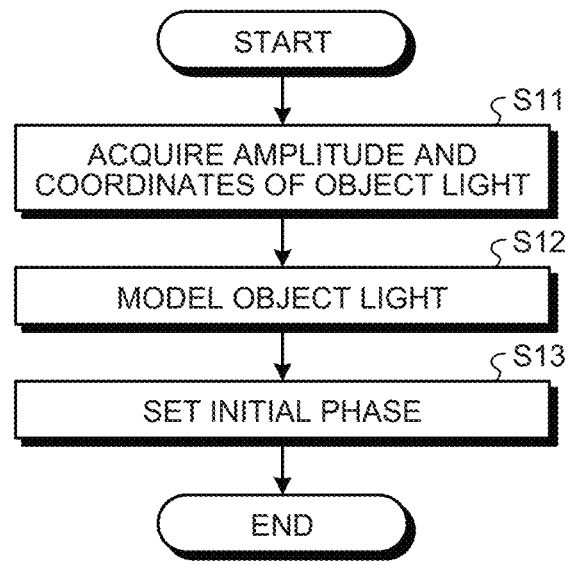
FIG. 5 is a flowchart illustrating an example of object light generating processing executed by the information processing device according to the embodiment.
Figure 6:
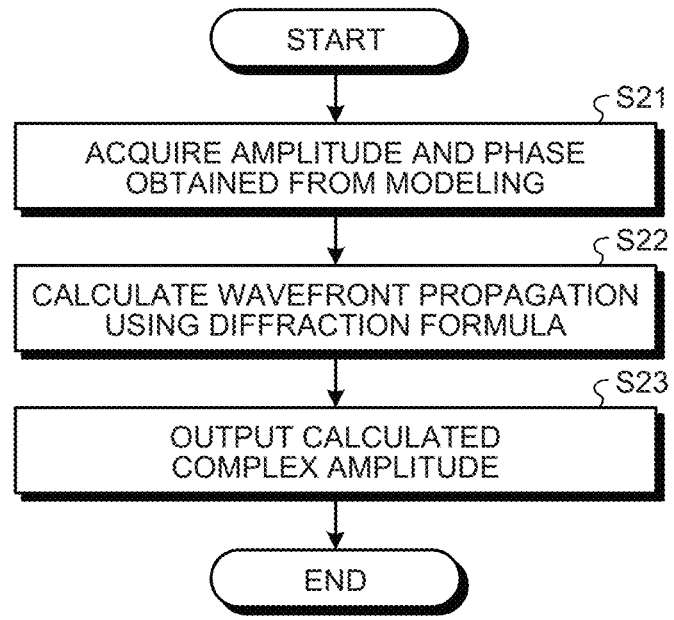
FIG. 6 is a flowchart illustrating an example of wavefront propagation calculating processing executed by the information processing device according to the embodiment.
Figure 7:
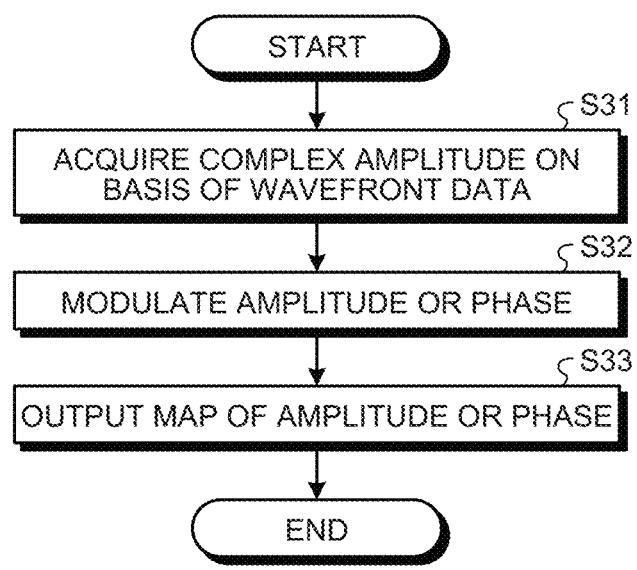
FIG. 7 is a flowchart illustrating an example of interference fringes generating processing executed by the information processing device according to the embodiment.

FIG. 5 is a flowchart illustrating an example of the object light generating processing executed by the information processing device 20 according to the embodiment. FIG. 6 is a flowchart illustrating an example of the wavefront propagation calculating processing executed by the information processing device 20 according to the embodiment. FIG. 7 is a flowchart illustrating an example of interference fringes generating processing executed by the information processing device 20 according to the embodiment. The processing procedure illustrated in FIGS. 5 to 7 is implemented by the control unit 22 of the information processing device 20 executing a program.

[Object Light Generating Processing]

As illustrated in FIG. 5, the control unit 22 of the information processing device 20 acquires the amplitude and the coordinates of the object light (step S11). For example, the control unit 22 acquires the amplitude and coordinates of the object light on the basis of RGB, the distance, and the like of the image data 21A. When the processing of step S11 is completed, the control unit 22 advances the processing to step S12.

The control unit 22 models the object light on the basis of the amplitude and coordinates information that have been acquired (step S12). For example, the control unit 22 generates images corresponding to layers by executing processing of converting light beam information so as to match the specification or the like of a hologram to be generated and generates the object light data 21B on the basis of the images. For example, the control unit 22 can use a known method for the processing of converting the light beam information. Examples of the known method include integral photography and the like. After storing the object light data 21B in the storage unit 21, the control unit 22 advances the processing to step S13.

The control unit 22 sets an initial phase (step S13). For example, the control unit 22 acquires complex amplitude of the amplitude and the phase of the object light for each pixel by uniformly modifying the phase, depending on the XY coordinates, with respect to pixel values of the object light data 21B. The control unit 22 sets the acquired phase as an initial phase in the object light data 21B. When the processing of step S13 is completed, the control unit 22 terminates the processing procedure illustrated in FIG. 5. The control unit 22 implements the object light generating unit 23 by executing the processing procedure illustrated in FIG. 5.

[Wavefront Propagation Calculating Processing]

The processing procedure illustrated in FIG. 6 is executed by the control unit 22 of the information processing device 20 when the object light generating processing illustrated in FIG. 5 ends. The control unit 22 acquires the amplitude and the phase obtained by the modeling (step S21). For example, the control unit 22 acquires the amplitude and the phase of each of layer images on the basis of the object light data 21B. When the processing of step S21 is completed, the control unit 22 advances the processing to step S22.

The control unit 22 calculates wavefront propagation using a diffraction formula (step S22). For example, the control unit 22 converts the light beam information into a distribution of complex amplitude for the object light data 21B of each of the plurality of layers on the basis of the above diffraction formula. For example, in a case where the Rayleigh-Sommerfeld diffraction formula is used, the control unit 22 calculates wavefront propagation between adjacent layers, between a layer and the hologram surface H1, or the like. For example, in the case of using the angular spectrum method, the control unit 22 executes Fourier transform processing using intensity information of an image for each object light data 21B, converts the light beam information into the complex amplitude, and calculates wavefront information. When the processing of step S22 is completed, the control unit 22 advances the processing to step S23.

The control unit 22 outputs the calculated complex amplitude (step S23). For example, the control unit 22 outputs the wavefront data 21C indicating the calculated complex amplitude to the interference fringes generating unit 25. When the processing of step S23 is completed, the control unit 22 terminates the processing procedure illustrated in FIG. 6. The control unit 22 implements the wavefront propagation calculating unit 24 by executing the processing procedure illustrated in FIG. 6.

[Interference Fringes Generating Processing]

The processing procedure illustrated in FIG. 7 is executed by the control unit 22 of the information processing device 20 when the wavefront propagation calculation processing illustrated in FIG. 6 ends. The control unit 22 acquires the complex amplitude on the basis of the wavefront data 21C (step S31). For example, the control unit 22 acquires the complex amplitude for each layer on the basis of the wavefront data 21C. When the processing of step S31 is completed, the control unit 22 advances the processing to step S32.

The control unit 22 modulates the amplitude or the phase (step S32). For example, the control unit 22 modulates the amplitude or the phase of the image using a phase modulation scheme so that the complex amplitude is expressed only by the amplitude or the phase in order to display the image by the display medium 11. The phase modulation scheme includes, for example, a double phase method. For example, the control unit 22 calculates the interference fringes between the object light and the reference light represented by the amplitude or the phase of the hologram surface H1 calculated for an image of each of the layers, thereby calculating a map of the hologram. When the processing of step S32 is completed, the control unit 22 advances the processing to step S33.

The control unit 22 outputs a map of the amplitude or the phase (step S33). The control unit 22 stores the hologram data 21D in the storage unit 21 by, for example, outputting the hologram data 21D indicating a map of the calculated hologram to the storage unit 21. For example, the control unit 22 may output the hologram data 21D to the hologram display unit 10. When the processing of step S33 is completed, the control unit 22 terminates the processing procedure illustrated in FIG. 7. The control unit 22 implements the interference fringes generating unit 25 by executing the processing procedure illustrated in FIG. 7.

[Exemplary Countermeasures Against Occlusion Region of Information Processing Device According to Embodiment]

The information processing device 20 according to the embodiment generates the hologram data 21D from the image data 21A by executing the object light generating processing, the wavefront propagation calculation processing, and the interference fringes generating processing. Hereinafter, a case where the information processing device 20 executes exemplary countermeasures for the occlusion region 213 in the object light generating processing (object light generating unit 23) will be described.

[Countermeasure (1) of Information Processing Device According to Embodiment]

Figure 8:
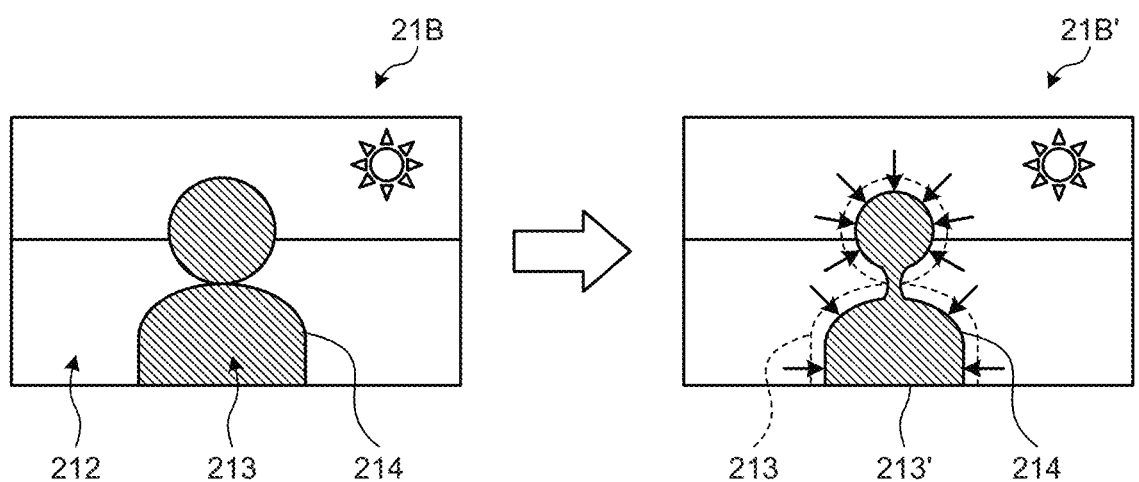
FIG. 8 is a diagram for explaining an overview of countermeasure (1) of the information processing device according to the embodiment.

FIG. 8 is a diagram for explaining an overview of countermeasure (1) of the information processing device 20 according to the embodiment. As illustrated in the left diagram of FIG. 8, ringing may occur from an amplitude edge 214 at the boundary with the background 212 in the occlusion region 213 of the object light data 21B. Meanwhile, it has been found that, in the occlusion region 213, as illustrated in the right diagram of FIG. 8, ringing does not leak up to the region of the foreground 211 by appropriately retracting the amplitude edge 214 to the inside of the occlusion region 213. The amplitude edge 214 refers to, for example, the amplitude of the edge portion of the image. The information processing device 20 is configured to be capable of providing countermeasure (1) for the amplitude edge 214.

[Countermeasure (1-1)]

Figure 9:
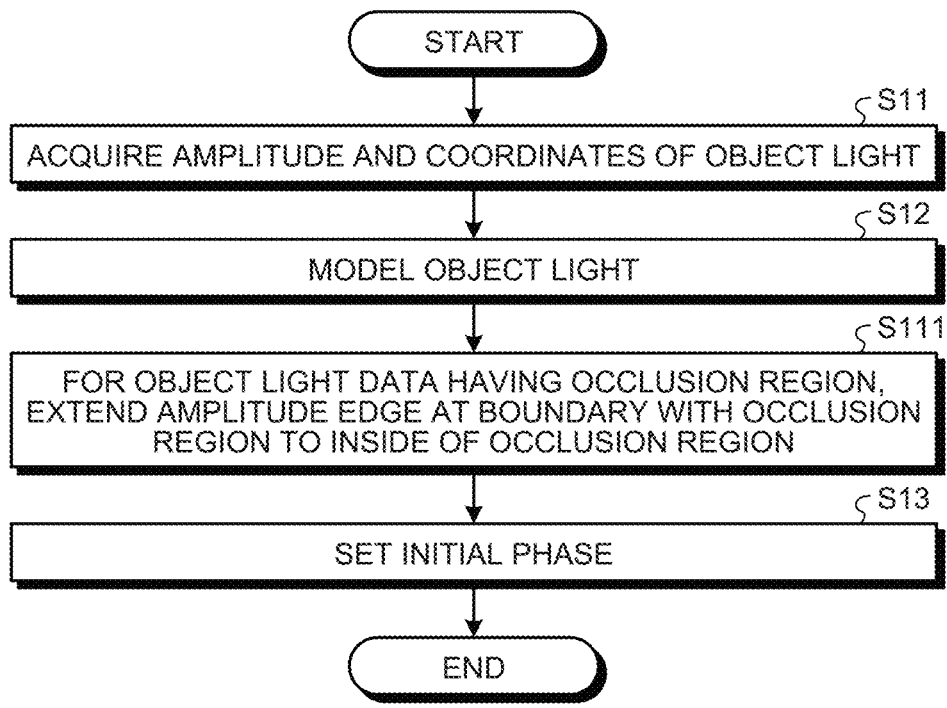
FIG. 9 is a flowchart in which countermeasure (1-1) is added to the object light generating processing illustrated in FIG. 5.

Countermeasure (1-1) is extending the amplitude of the background image. Specifically, countermeasure (1-1) is extending the amplitude edge 214 of the image of the background 212 toward the inside of the occlusion region 213. FIG. 9 is a flowchart in which countermeasure (1-1) is added to the object light generating processing illustrated in FIG. 5. The processing procedure illustrated in FIG. 9 is implemented by the control unit 22 of the information processing device 20 executing a program.

As illustrated in FIG. 9, the control unit 22 of the information processing device 20 acquires the amplitude and the coordinates of the object light (step S1*l*). The control unit 22 models the object light on the basis of the amplitude and coordinates information that have been acquired (step S12). After generating the object light data 21B, the control unit 22 advances the processing to step S111.

For the object light data 21B having the occlusion region 213, the control unit 22 extends the amplitude edge 214 at the boundary with the occlusion region 213 to the inside of the occlusion region 213 (step S111). For example, the control unit 22 specifies the occlusion region 213 from among the plurality of pieces of object light data 21B on the basis of an anteroposterior relationship or the like of the objects. Then, the control unit 22 applies a dilation filter or the like to the amplitude of the background 212 represented by the object light data 21B and extends the background 212 toward the inside of the occlusion region 213. For example, the control unit 22 fills the pixel values in the vicinity of the boundary of the occlusion region 213 with 0, and in a case where there is one or more pixels having a pixel value greater than or equal to 1 in a predetermined region (kernel) in the vicinity of the boundary, the pixel value of pixels of interest of the image of the background 212 is set to an average value thereof. As a result, the control unit 22 modifies the amplitude in the object light data 21B in the vicinity of the boundary with the occlusion region 213 by extending the image of the background 212 toward the inside of the occlusion region 213. The control unit 22 takes a countermeasure against the object light data 21B for each of the plurality of layers. Note that the processing of step S111 is skipped for object light data 21B having no occlusion region 213. When the processing of step S111 is completed, the control unit 22 advances the processing to step S13. Note that the control unit 22 functions as the specifying unit 23A and the modifying unit 23B by executing step S111.

The control unit 22 sets an initial phase (step S13). When the processing of step S13 is completed, the control unit 22 terminates the processing procedure illustrated in FIG. 9.

The control unit 22 implements the object light generating unit 23 by executing the processing procedure illustrated in FIG. 9.

When the execution of the object light generating processing ends, the information processing device 20 sequentially executes the wavefront propagation calculation processing and the interference fringes generating processing described above. As a result, since the information processing device 20 has extended the amplitude of the boundary of the occlusion region 213 by countermeasure (1-1), it is possible to generate the hologram data 21D in which leakage of the wavefront at the boundary of the occlusion region 213 is suppressed. As a result, the information processing device 20 can suppress a leakage of the wavefront from the boundary of the occlusion region 213 even when the hologram data 21D is reproduced.

[Countermeasure (1-2)]

Figure 10:
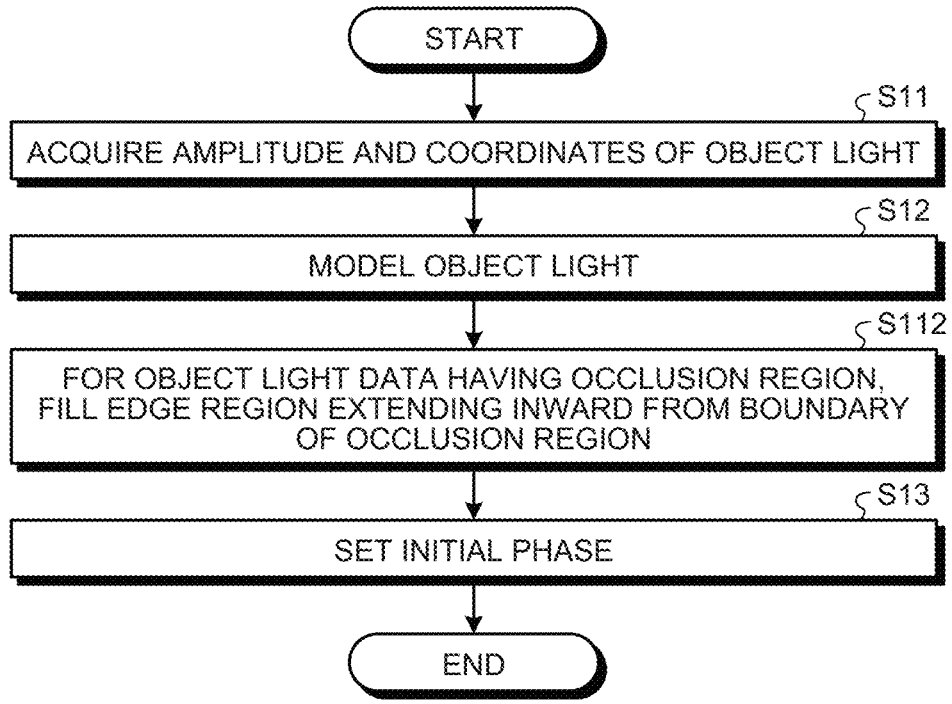
FIG. 10 is a flowchart in which countermeasure (1-2) is added to the object light generating processing illustrated in FIG. 5.

Countermeasure (1-2) is extending the amplitude of the background image. Specifically, countermeasure (1-2) is a countermeasure for extending the amplitude edge 214 of the image of the background 212 by filling the inside of the occlusion region 213. FIG. 10 is a flowchart in which countermeasure (1-2) is added to the object light generating processing illustrated in FIG. 5. The processing procedure illustrated in FIG. 10 is implemented by the control unit 22 of the information processing device 20 executing a program.

As illustrated in FIG. 10, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S112.

For the object light data 21B having the occlusion region 213, the control unit 22 fills an edge region extending inward from the boundary of the occlusion region 213 with respect to (step S112). For example, the control unit 22 specifies the occlusion region 213 from among the plurality of pieces of object light data 21B on the basis of an anteroposterior relationship or the like of the objects. Then, the control unit 22 executes inpainting processing or the like on the amplitude of the background 212 represented by the object light data 21B and fills the region inside the boundary of the occlusion region 213. Note that the region inside the boundary of the occlusion region 213 can be set in consideration of results of machine learning, simulation, and the like of the occurrence of ringing. For example, the control unit 22 replaces a value of one pixel in the vicinity region to be corrected with a weighted sum of pixel values of pixels whose pixel values are already known among surrounding pixels. As a result, the control unit 22 modifies the amplitude in the object light data 21B in the vicinity of the boundary with the occlusion region 213 by extending the image of the background 212 toward the inside of the occlusion region 213. The control unit 22 takes a countermeasure against the object light data 21B for each of the plurality of layers. Note that the processing of step S112 is skipped for object light data 21B having no occlusion region 213. When the processing of step S112 is completed, the control unit 22 advances the processing to step S13. Note that the control unit 22 functions as the specifying unit 23A and the modifying unit 23B by executing step S112.

The control unit 22 sets an initial phase (step S13). When the processing of step S13 is completed, the control unit 22 terminates the processing procedure illustrated in FIG. 10.

The control unit 22 implements the object light generating unit 23 by executing the processing procedure illustrated in FIG. 10.

When the execution of the object light generating processing ends, the information processing device 20 sequentially executes the wavefront propagation calculation processing and the interference fringes generating processing described above. As a result, since the information processing device 20 has extended the amplitude of the boundary of the occlusion region 213 by countermeasure (1-2), it is possible to generate the hologram data 21D in which leakage of the wavefront at the boundary of the occlusion region 213 is suppressed. As a result, the information processing device 20 can suppress a leakage of the wavefront from the boundary of the occlusion region 213 even when the hologram data 21D is reproduced.

[Countermeasure (1-3)]

Figure 11:
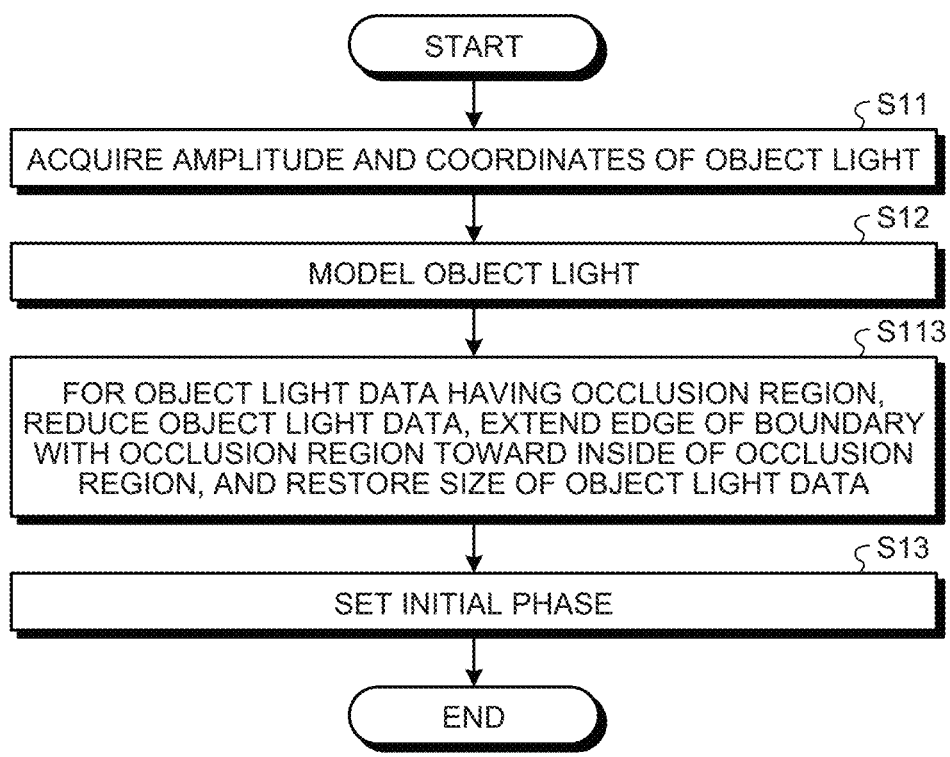
FIG. 11 is a flowchart in which countermeasure (1-3) is added to the object light generating processing illustrated in FIG. 5.

Countermeasure (1-3) is extending the amplitude of the background image. The processing of extending the amplitude has a large calculation amount. Therefore, countermeasure (1-3) is suppressing the calculation amount of the processing for extending the amplitude and extending the amplitude of the background image. FIG. 11 is a flowchart in which countermeasure (1-3) is added to the object light generating processing illustrated in FIG. 5. The processing procedure illustrated in FIG. 11 is implemented by the control unit 22 of the information processing device 20 executing a program.

As illustrated in FIG. 11, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S113.

For the object light data 21B having the occlusion region 213, the control unit 22 reduces the object light data 21B, extends the edge of the boundary with the occlusion region 213 toward the inside of the occlusion region 213, and restores the size of the object light data 21B (step S113). For example, after specifying the occlusion region 213 from among the plurality of pieces of object light data 21B on the basis of the anteroposterior relationship or the like of the objects, the control unit 22 executes a processing procedure illustrated in FIG. 12.

Figure 12:
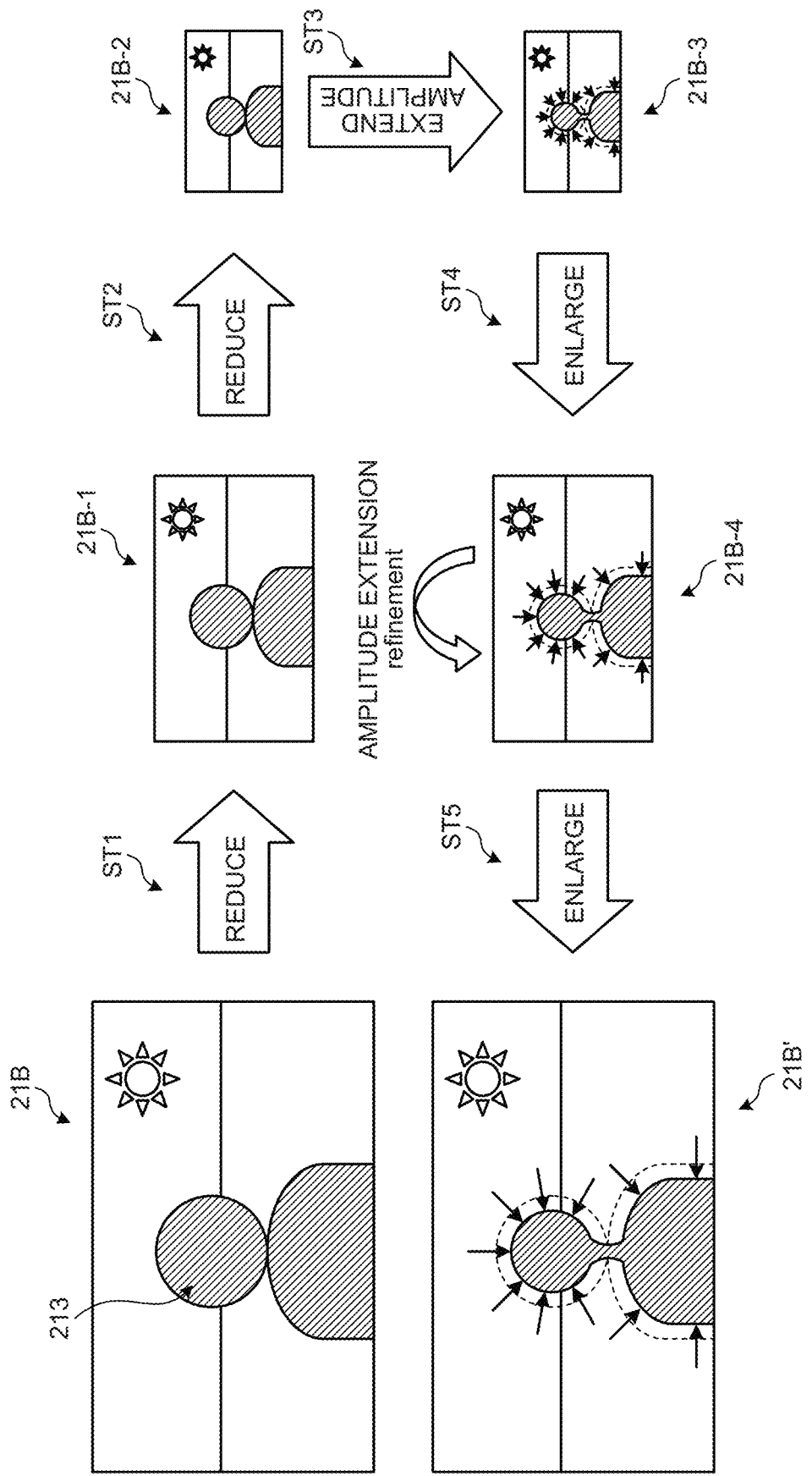
FIG. 12 is a diagram for explaining an example of countermeasure (1-3) in the object light generating processing.

FIG. 12 is a diagram for explaining an example of countermeasure (1-3) in the object light generating processing. As illustrated in FIG. 12, the control unit 22 executes processing of reducing the object light data 21B at a first reduction ratio (step ST1). The control unit 22 executes processing of reducing the reduced object light data 21B-1 at a second reduction ratio (step ST2). The control unit 22 executes processing of extending the amplitude of the background image on the reduced object light data 21B-2 (step ST3). In the processing of extending the amplitude, the processing of countermeasure (1-1) or countermeasure (1-2) can be executed. The control unit 22 executes the processing of enlarging the object light data 21B-3 having been subjected to the processing of extending the amplitude at a second enlargement ratio (step ST4). The second enlargement ratio is a magnification for restoring the second reduction ratio. The control unit 22 executes the processing of extending the amplitude of the enlarged object light data 21B-4 and enlarging the data at a first enlargement ratio (step ST5). The first enlargement ratio is a magnification for restoring the first reduction ratio. The control unit 22 can suppress an increase in the calculation amount and obtain object light data 21B' in which the image of the background 212 is extended toward the inside of the occlusion region 213. As a result, the control unit 22 modifies the amplitude in the object light data 21B in the vicinity of the boundary with the occlusion region 213 by extending the image of the background 212 toward the inside of the occlusion region 213.

Returning to FIG. 11, the control unit 22 performs a countermeasure against the object light data 21B for each of the plurality of layers. Note that the processing of step S113 is skipped for object light data 21B having no occlusion region 213. When the processing of step S113 is completed, the control unit 22 advances the processing to step S13. Note that the control unit 22 functions as the specifying unit 23A and the modifying unit 23B by executing step S113.

The control unit 22 sets an initial phase (step S13). When the processing of step S13 is completed, the control unit 22 terminates the processing procedure illustrated in FIG. 11. The control unit 22 implements the object light generating unit 23 by executing the processing procedure illustrated in FIG. 11.

When the execution of the object light generating processing ends, the information processing device 20 sequentially executes the wavefront propagation calculation processing and the interference fringes generating processing described above. As a result, since the information processing device 20 has extended the amplitude of the boundary of the occlusion region 213 by countermeasure (1-3), it is possible to generate the hologram data 21D in which leakage of the wavefront at the boundary of the occlusion region 213 is suppressed. Moreover, the information processing device 20 can suppress also an increase in the calculation amount related to countermeasure (1-3). As a result, the information processing device 20 can suppress a leakage of the wavefront from the boundary of the occlusion region 213 even when the hologram data 21D is reproduced.

[Countermeasure (2) of Information Processing Device According to Embodiment]

As described in the above countermeasure (1), ringing may occur from the amplitude edge 214 at the boundary with the background 212 in the occlusion region 213 of the object light data 21B. Meanwhile, it has been found that the occurrence of ringing is suppressed in the occlusion region 213 by smoothing the changes in the amplitude at the boundary of the occlusion region 213. The information processing device 20 is configured to be capable of providing countermeasure (2) of smoothing the amplitude of the background.

Figure 13:
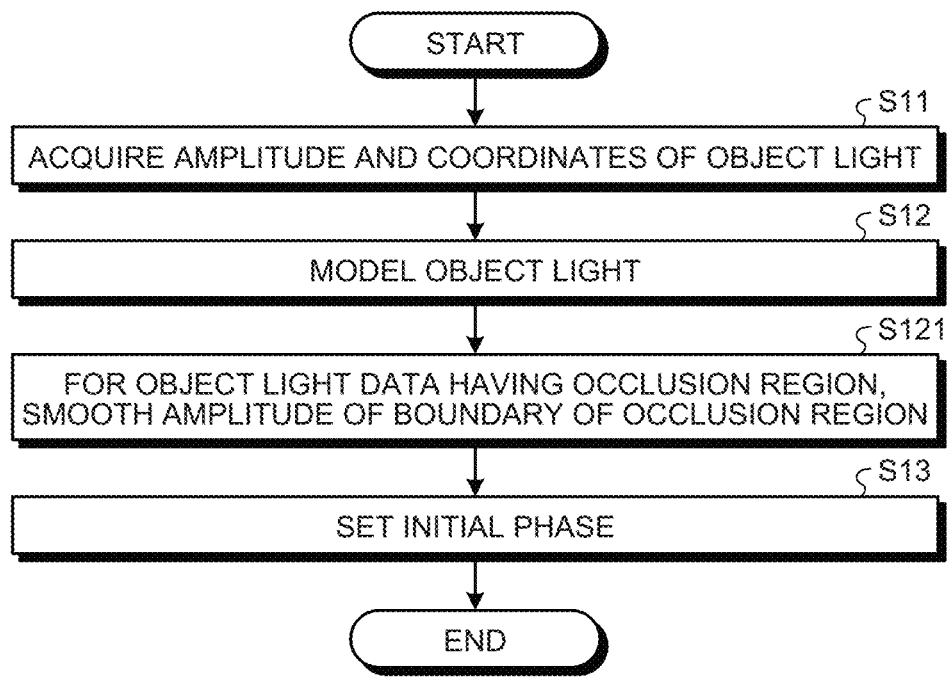
FIG. 13 is a flowchart in which countermeasure (2) is added to the object light generating processing illustrated in FIG. 5.

FIG. 13 is a flowchart in which countermeasure (2) is added to the object light generating processing illustrated in FIG. 5. The processing procedure illustrated in FIG. 13 is implemented by the control unit 22 of the information processing device 20 executing a program.

As illustrated in FIG. 13, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S121.

The control unit 22 averages the amplitude of the boundary with the occlusion region 213 with respect to the object light data 21B having the occlusion region 213 (step S121). For example, the control unit 22 specifies the occlusion region 213 from among the plurality of pieces of object light data 21B on the basis of an anteroposterior relationship or the like of the objects. Then, the control unit 22 extends the background image in the vicinity of the boundary of the occlusion region 213, applies a low pass filter or the like to the vicinity of the boundary, and smooths the amplitude of the background image in the vicinity of the boundary of the occlusion region 213. As a result, the control unit 22 modifies the amplitude in the object light data 21B in the vicinity of the boundary with the occlusion region 213 by smoothing the changes in the amplitude of the background image in the vicinity of the boundary of the occlusion region 213. The control unit 22 takes a countermeasure against the object light data 21B for each of the plurality of layers. Note that the processing of step S121 is skipped for object light data 21B having no occlusion region 213. When the processing of step S121 is completed, the control unit 22 advances the processing to step S13. Note that the control unit 22 functions as the specifying unit 23A and the modifying unit 23B by executing step S121.

The control unit 22 sets an initial phase (step S13). When the processing of step S13 is completed, the control unit 22 terminates the processing procedure illustrated in FIG. 13. The control unit 22 implements the object light generating unit 23 by executing the processing procedure illustrated in FIG. 13.

When the execution of the object light generating processing ends, the information processing device 20 sequentially executes the wavefront propagation calculation processing and the interference fringes generating processing described above. As a result, since the information processing device 20 has smoothed the boundary of the occlusion region 213 by countermeasure (2), it is possible to generate the hologram data 21D in which the occurrence of ringing at the boundary of the occlusion region 213 is suppressed. As a result, the information processing device 20 can suppress the occurrence of ringing at the boundary of the occlusion region 213 even when the hologram data 21D is reproduced.

Note that, in countermeasure (2) of the present embodiment, a case where the control unit 22 of the information processing device 20 performs the smoothing processing after extending the object light data 21B will be described, however, it is not limited thereto. For example, the control unit 22 may perform the smoothing processing without extending the object light data 21B.

[Countermeasure (3) of Information Processing Device According to Embodiment]

The processing of the amplitude extension of countermeasure (1) and the amplitude extension and smoothing of countermeasure (2) has a large calculation amount. In the smoothing of countermeasure (2), in a case where the vicinity of the boundary of the occlusion region 213 is flat, the influence of the smoothing is less noticeable even if the amplitude extension is not performed. Therefore, the information processing device 20 is configured to be capable of providing countermeasure (3) for switching the countermeasure on the basis of the amplitude distribution in the vicinity of the boundary of the occlusion region 213.

[Countermeasure (3-1)]

Figure 14:
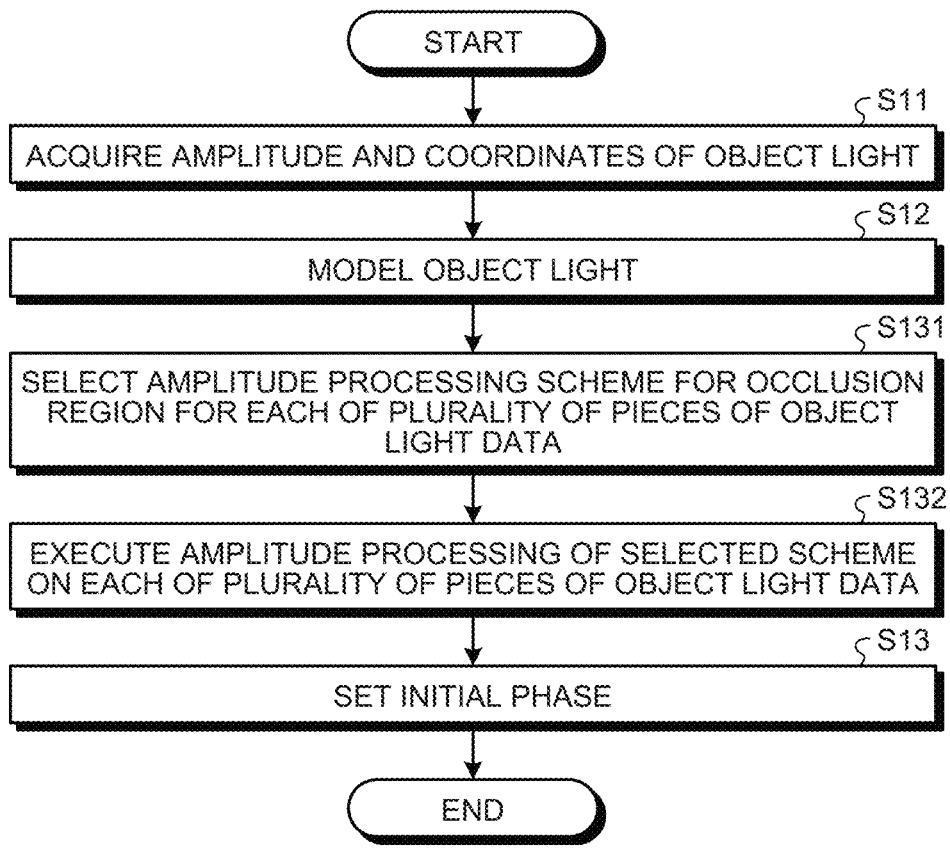
FIG. 14 is a flowchart in which countermeasure (3-1) is added to the object light generating processing illustrated in FIG. 5.

Countermeasure (3-1) is switching amplitude processing for the background image. Specifically, countermeasure (3-1) is switching amplitude processing on the basis of an amplitude distribution in the vicinity of the boundary of the occlusion region 213. FIG. 14 is a flowchart in which countermeasure (3-1) is added to the object light generating processing illustrated in FIG. 5. The processing procedure illustrated in FIG. 14 is implemented by the control unit 22 of the information processing device 20 executing a program.

As illustrated in FIG. 14, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S131.

The control unit 22 selects an amplitude processing scheme for the occlusion region 213 for each of the plurality of pieces of object light data 21B (step S131). For example, the control unit 22 specifies the occlusion region 213 for each of the plurality of pieces of object light data 21B on the basis of the anteroposterior relationship or the like of the objects. Then, in a case where the occlusion region 213 is specified, the control unit 22 selects an amplitude processing scheme on the basis of selection conditions. The selection conditions include, for example, a condition for selecting smoothing in a case where the distribution of the amplitude in the vicinity of the occlusion region 213 is flat and, in a case where the distribution of the amplitude is not flat, selecting any one of amplitude extension or amplitude extension and smoothing. Note that the selection condition may further include a condition for selecting either amplitude extension or amplitude extension and smoothing in a case where the distribution of the amplitude is not flat. After storing the selection result of step S131 in the storage unit 21, the control unit 22 advances the processing to step S132.

The control unit 22 executes amplitude processing of the selected scheme for each of the plurality of pieces of object light data 21B (step S132). For example, the control unit 22 executes amplitude processing by smoothing on the object light data 21B for which smoothing has been selected. For example, the control unit 22 executes amplitude processing by amplitude extension or amplitude extension and smoothing on the object light data 21B for which either amplitude extension or amplitude extension and smoothing is selected. As a result, the control unit 22 takes a countermeasure for the object light data 21B for each of the plurality of layers by executing amplitude processing suitable for the state of the amplitude distribution in the vicinity of the boundary of the occlusion region 213 and modifies the amplitude in the object light data 21B in the vicinity of the boundary with the occlusion region 213. When the processing of step S132 is completed, the control unit 22 advances the processing to step S13. Note that the control unit 22 functions as the specifying unit 23A and the modifying unit 23B by executing steps S131 and S132.

The control unit 22 sets an initial phase (step S13). When the processing of step S13 is completed, the control unit 22 terminates the processing procedure illustrated in FIG. 14. The control unit 22 implements the object light generating unit 23 by executing the processing procedure illustrated in FIG. 14.

When the execution of the object light generating processing ends, the information processing device 20 sequentially executes the wavefront propagation calculation processing and the interference fringes generating processing described above. As a result, since the information processing device 20 extends the amplitude of the boundary of the occlusion region 213 depending on the distribution of the amplitude by countermeasure (3-1), it is possible to generate the hologram data 21D in which leakage of the wavefront at the boundary of the occlusion region 213 is suppressed. As a result, the information processing device 20 can optimize the effect of suppressing ringing in the vicinity of the boundary of the occlusion region 213 and suppress the calculation amount.

[Countermeasure (3-2)]

Figure 15:
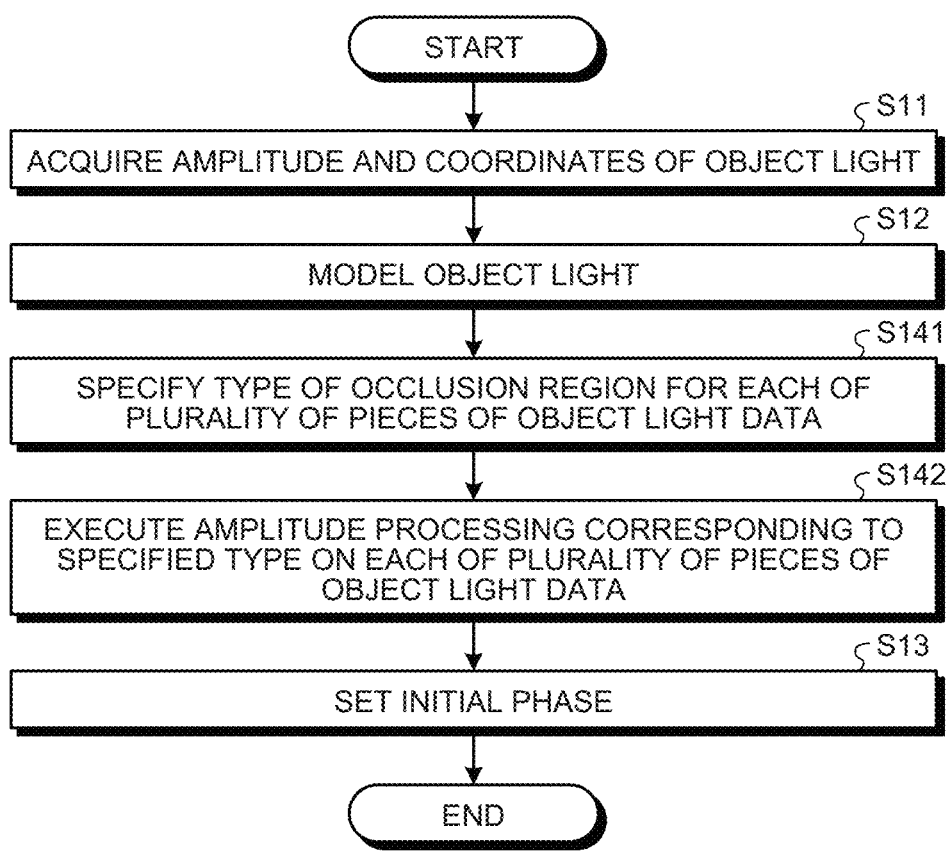
FIG. 15 is a flowchart in which countermeasure (3-2) is added to the object light generating processing illustrated in FIG. 5.

Countermeasure (3-2) is switching the amplitude processing for the background image. Specifically, countermeasure (3-2) is switching the amplitude processing depending on the type of the occlusion region 213 of the object light data 21B. FIG. 15 is a flowchart in which countermeasure (3-2) is added to the object light generating processing illustrated in FIG. 5. The processing procedure illustrated in FIG. 15 is implemented by the control unit 22 of the information processing device 20 executing a program.

As illustrated in FIG. 15, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S141.

The control unit 22 specifies the type of the occlusion region 213 for each of the plurality of pieces of object light data 21B (step S141). For example, the occlusion region 213 has types such as self-occlusion and mutual occlusion. Self-occlusion includes occlusion caused by an anteroposterior relationship in the same object. The term "in the same object" includes, for example, a relationship between the face and the hands of a person. Mutual occlusion includes occlusion caused by an anteroposterior relationship between different objects. For example, the control unit 22 specifies the occlusion region 213 for each of the plurality of pieces of object light data 21B on the basis of the anteroposterior relationship or the like of the objects. Then, the control unit 22 specifies the type of each of the occlusion regions 213 on the basis of the anteroposterior relationship of the occlusion regions 213 of the object light data 21B for each of the plurality of layers. The control unit 22 distinguishes between self-occlusion and mutual occlusion on the basis of plane coordinates and a depth range. The control unit 22 specifies a region having close plane coordinates and depth as self-occlusion. After storing the specification result of step S141 in the storage unit 21, the control unit 22 advances the processing to step S142.

The control unit 22 executes amplitude processing depending on the specified type for each of the plurality of pieces of object light data 21B (step S142). For example, the information processing device 20 sets amplitude processing by extension in a case where the type is mutual occlusion and sets amplitude processing by projection in a case where the type is self-occlusion. In this case, in a case where the specified result is mutual occlusion, the control unit 22 executes processing of extending the amplitude in the vicinity of the boundary of the occlusion region 213 for each of the plurality of pieces of object light data 21B. In a case where the specified result is self-occlusion, the control unit 22 executes processing of projecting the image of the foreground in parallel to the occlusion region 213.

FIG. 16 is a diagram for explaining an example of countermeasure (3-2) depending on the type of an occlusion region. The left diagram in FIG. 16 illustrates an example of processing of an image for each layer of mutual occlusion. The left diagram in FIG. 16 illustrates an example in which images, indicating the anteroposterior relationship of different objects, are divided for each layer. The right diagram in FIG. 16 illustrates an example of processing of an image for each layer of self-occlusion. The right diagram in FIG. 16 illustrates an example in which images indicating the anteroposterior relationship of the same object are divided for each layer. In FIG. 16, an image 221, an image 222, and an image 223 of each layer are separated from the hologram surface H1 in the order mentioned. In the image 222, a portion corresponding to the image 221, which is the foreground, is the occlusion region 213. In the image 223, portions of the image 221 and the image 222 that are the foreground are the occlusion regions 213.

In a case where the type of the occlusion region 213 is specified as mutual occlusion, as illustrated in the left diagram of FIG. 16, the control unit 22 executes processing of extending the amplitude edge 214 in the vicinity of the boundary of the occlusion region 213 to the inside of the occlusion region 213. Furthermore, in a case where the type of the occlusion region 213 is specified as self-occlusion, the control unit 22 executes processing of projecting the image of the foreground in parallel onto a portion of the occlusion region 213 as illustrated in the right diagram of FIG. 16. For example, the control unit 22 performs the extension so that an image 221' obtained by parallel projection of the image 221 fills the occlusion region 213 of the image 222. The control unit 22 performs the extension so that an image 222' obtained by parallel projection of the image 221' and the image 222 onto the image 223 of the background fills the occlusion region 213 of the image 223. The control unit 22 performs a countermeasure suitable for the object light data 21B for each of the plurality of layers by executing amplitude processing suitable for the type of an occlusion region 213. The control unit 22 performs amplitude processing on the object light data 21B for each of the plurality of layers. As a result, the control unit 22 modifies the amplitude in the object light data 21B in the vicinity of the boundary with the occlusion region 213 by extending the image of the background 212 toward the inside of the occlusion region 213 or filling the inside of the occlusion region 213 with the foreground image. Referring back to FIG. 15, when the processing of step S142 is completed, the control unit 22 advances the processing to step S13. Note that the control unit 22 functions as the specifying unit 23A and the modifying unit 23B by executing steps S141 and S142.

The control unit 22 sets an initial phase (step S13). When the processing of step S13 is completed, the control unit 22 terminates the processing procedure illustrated in FIG. 15. The control unit 22 implements the object light generating unit 23 by executing the processing procedure illustrated in FIG. 15.

When the execution of the object light generating processing ends, the information processing device 20 sequentially executes the wavefront propagation calculation processing and the interference fringes generating processing described above. As a result, since the information processing device 20 has extended the amplitude of the boundary of the occlusion region 213 by countermeasure (3-2), it is possible to generate the hologram data 21D in which leakage of the wavefront at the boundary of the occlusion region 213 is suppressed. As a result, the information processing device 20 can optimize the effect of suppressing ringing in the vicinity of the boundary of the occlusion region 213 and suppress the calculation amount.

[Countermeasure (4) of Information Processing Device According to Embodiment]

The information processing device 20 is configured to be capable of providing countermeasure (4) for setting an initial phase in the vicinity of the boundary so that the wavefront generated from the boundary of the occlusion region 213 of the object light data 21B does not spread into the foreground region.

Figure 17:
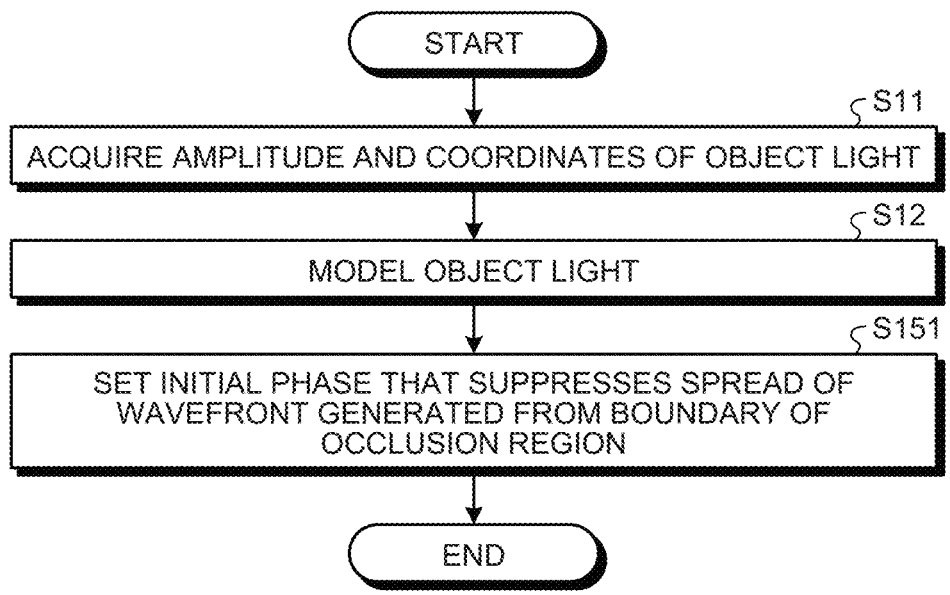
FIG. 17 is a flowchart in which countermeasure (4) is added to the object light generating processing illustrated in FIG. 5.

FIG. 17 is a flowchart in which countermeasure (4) is added to the object light generating processing illustrated in FIG. 5. The processing procedure illustrated in FIG. 17 is implemented by the control unit 22 of the information processing device 20 executing a program.

As illustrated in FIG. 17, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S151.

The control unit 22 sets an initial phase that suppresses the spread of a wavefront generated from the boundary of the occlusion region 213 (step S151). For example, the control unit 22 acquires complex amplitude of the amplitude and the phase of the object light for each pixel by uniformly modifying the phase, depending on the XY coordinates, with respect to pixel values of the object light data 21B. The control unit 22 sets the acquired phase as an initial phase in the object light data 21B. Then, the control unit 22 specifies the occlusion region 213 from the plurality of pieces of object light data 21B on the basis of the anteroposterior relationship or the like of the objects. In a case where the object light data 21B has the occlusion region 213, the control unit 22 fills the amplitude of the occlusion region 213 of the background with a value greater than 0 and sets an initial phase, which gives a light condensing effect of converging toward the center of the occlusion region 213, in the vicinity of the boundary of the occlusion region 213 of the background. Examples of the initial phase that gives the light condensing effect include a quadratic phase. As a result, the control unit 22 modifies the phase in the object light data 21B in the vicinity of the boundary of the occlusion region 213. When the processing of step S151 is completed, the control unit 22 terminates the processing procedure illustrated in FIG. 17. Note that the control unit 22 implements the object light generating unit 23 by executing the processing procedure illustrated in FIG. 17 and functions as the specifying unit 23A and the modifying unit 23B.

When the execution of the object light generating processing ends, the information processing device 20 sequentially executes the wavefront propagation calculation processing and the interference fringes generating processing described above. As a result, since the information processing device 20 sets the initial phase in the vicinity of the boundary of the occlusion region 213 by countermeasure (4), it is possible to generate the hologram data 21D in which leakage of the wavefront in the vicinity of the boundary is suppressed. As a result, the information processing device 20 can suppress a leakage of the wavefront from the boundary of the occlusion region 213 even when the hologram data 21D is reproduced.

[Countermeasure (5) of Information Processing Device According to Embodiment]

It is known that a known random phase is used as the initial phase of the hologram H in order to diffuse light with a high spatial frequency. However, it is known that speckle noise is generated in the hologram H in a case where a random phase is used. The information processing device 20 is configured to be capable of providing countermeasure (5) for assigning a random phase only in the vicinity of the boundary of the occlusion region 213 of the object light data 21B.

Figure 18:
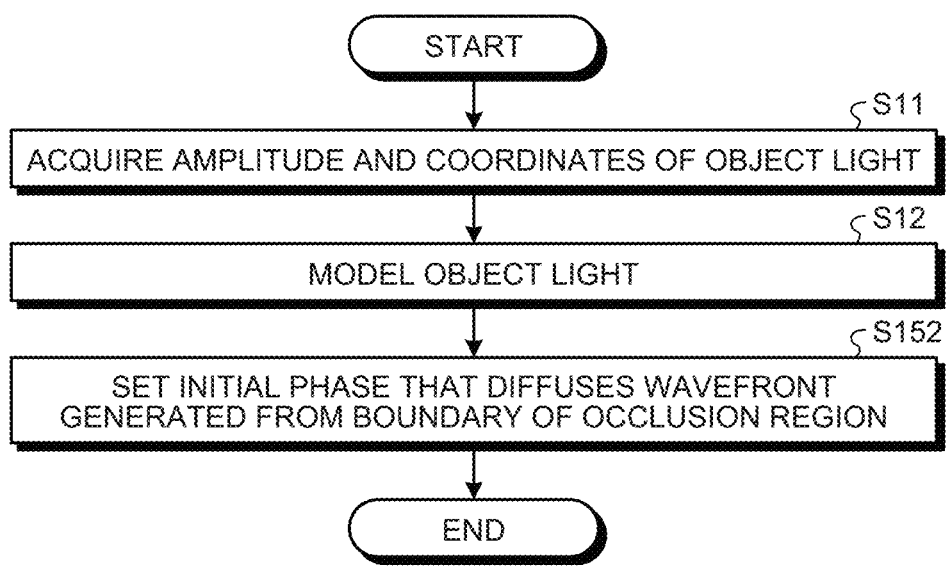
FIG. 18 is a flowchart in which countermeasure (5) is added to the object light generating processing illustrated in FIG. 5.

FIG. 18 is a flowchart in which countermeasure (5) is added to the object light generating processing illustrated in FIG. 5. The processing procedure illustrated in FIG. 18 is implemented by the control unit 22 of the information processing device 20 executing a program.

As illustrated in FIG. 18, the control unit 22 of the information processing device 20 acquires the amplitude and the coordinates of the object light (step S11). The control unit 22 models the object light on the basis of the amplitude and coordinates information that have been acquired (step S12). After generating the object light data 21B, the control unit 22 advances the processing to step S152.

The control unit 22 sets an initial phase that diffuses the wavefront generated from the boundary of the occlusion region 213 (step S152). For example, the control unit 22 acquires complex amplitude of the amplitude and the phase of the object light for each pixel by uniformly modifying the phase, depending on the XY coordinates, with respect to pixel values of the object light data 21B. The control unit 22 sets the acquired phase as an initial phase in the object light data 21B. Then, the control unit 22 specifies the occlusion region 213 from the plurality of pieces of object light data 21B on the basis of the anteroposterior relationship or the like of the objects. In a case where the object light data 21B has the occlusion region 213, the control unit 22 sets an initial phase that limits a region where speckle noise occurs only to the vicinity of the boundary of the occlusion region 213 in the background by applying a random phase only in the vicinity of the boundary of the occlusion region 213. When the processing of step S152 is completed, the control unit 22 terminates the processing procedure illustrated in FIG. 18. Note that the control unit 22 implements the object light generating unit 23 by executing the processing procedure illustrated in FIG. 18 and functions as the specifying unit 23A and the modifying unit 23B.

When the execution of the object light generating processing ends, the information processing device 20 sequentially executes the wavefront propagation calculation processing and the interference fringes generating processing described above. As a result, since the information processing device 20 sets the initial phase that limits the region where speckle noise occurs only to the vicinity of the boundary of the occlusion region 213 by countermeasure (5), it is possible to generate the hologram data 21D in which generation of speckle noise other than in the vicinity of the boundary is suppressed. As a result, even when the hologram data 21D is reproduced, the information processing device 20 can suppress ringing at the boundary of the occlusion region 213 and occurrence of speckle noise other than in the vicinity of the boundary.

Note that in the above embodiment, countermeasures (1) to (5) may be switched, applied to other countermeasures, or combined. For example, the information processing device 20 may modify the object light data 21B by combining amplitude extension and setting of an initial phase.

[Hardware Configuration]

Figure 19:
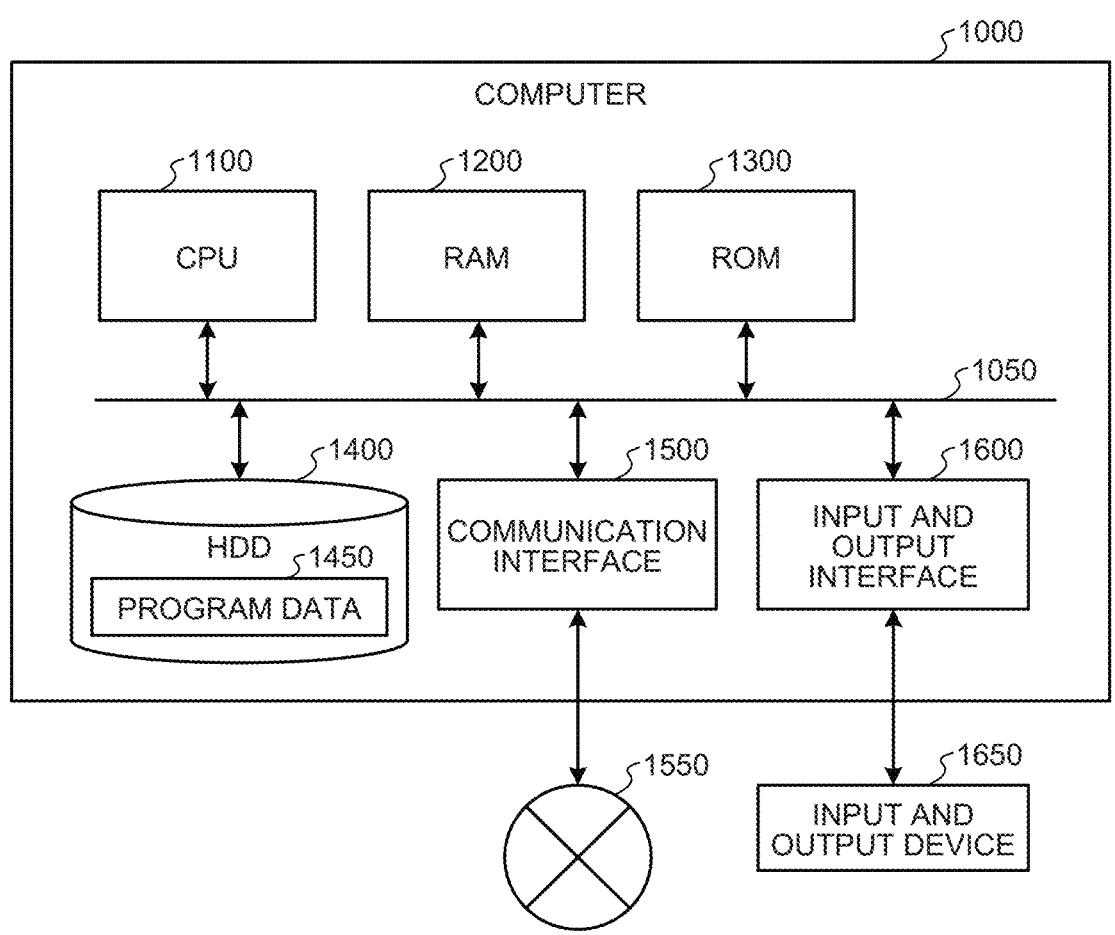
FIG. 19 is a hardware configuration diagram illustrating an example of a computer that implements the functions of the information processing device.

The information processing device 20 according to the embodiment described above may be implemented by a computer 1000 having a configuration as illustrated in FIG. 19, for example. Hereinafter, the information processing device 20 according to the embodiment will be described as an example. FIG. 19 is a hardware configuration diagram illustrating an example of the computer 1000 that implements the functions of the information processing device 20. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records an information processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard and a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium. A medium is, for example, an optical recording medium such as a digital versatile disc (DVD), a magneto-optical recording medium such as a magneto-optical disk (MO), a tape medium, a magnetic recording medium, a semiconductor memory, or the like.

For example, in a case where the computer 1000 functions as the information processing device 20 according to the embodiment, the CPU 1100 of the computer 1000 implements the functions of the specifying unit 23A, the modifying unit 23B, or other units by executing a program loaded on the RAM 1200. The HDD 1400 also stores a program according to the present disclosure or data in the storage unit 21. Note that although the CPU 1100 reads the program data 1450 from the HDD 1400 and executes the program data 1450, as another example, these programs may be acquired from another device via the external network 1550.

Although the preferred embodiments of the present disclosure have been described in detail by referring to the accompanying drawings, the technical scope of the present disclosure is not limited to such examples. It is obvious that a person having ordinary knowledge in the technical field of the present disclosure can conceive various modifications or variations within the scope of the technical idea described in the claims, and it is naturally understood that these also belong to the technical scope of the present disclosure.

Furthermore, the effects described in the present specification are merely illustrative or exemplary and are not limiting. That is, the technology according to the present disclosure can achieve other effects that are obvious to those skilled in the art from the description of the present specification together with or in place of the above effects.

Furthermore, it is also possible to create a program for causing hardware such as a CPU, a ROM, and a RAM built in a computer to implement functions equivalent to those of the configuration of the information processing device 20 and to provide a computer-readable recording medium recording the program.

Meanwhile, the steps according to the processing of the information processing device 20 in the present specification are not necessarily processed in time series in the order described in the flowchart. For example, the steps according to the processing of the information processing device 20 may be processed in an order different from the order described in the flowchart or may be processed in parallel.

In the present embodiment, the case where the layer data is the object light data 21B has been described, however, it is not limited thereto. For example, layer data is different depending on the original data for generating the hologram data 21D. For example, in a case where a point-based method for generating the hologram data 21D is used, layer data is obtained by hierarchizing a set of point objects. For example, layer data is obtained by hierarchizing data in which an object is expressed by a polygon.

(Effects)

The information processing device 20 includes: the specifying unit 23A that specifies, from a plurality of pieces of layer data capable of expressing object light of a three-dimensional object in a stepwise manner, an occlusion region 213 that is lost due to a foreground image of layer data of another hierarchy; and the modifying unit 23B that modifies at least one of the amplitude or the phase in layer data at a boundary with the occlusion region 213 that has been specified so that leakage of the object light to the outside of the occlusion region 213 is suppressed.

As a result, after specifying the occlusion region 213 in the layer data, the information processing device 20 can modify the layer data so as to suppress leakage of the object light to the outside of the occlusion region 213. As a result, the information processing device 20 can suppress occurrence of ringing in the hologram H having the anteroposterior relationship of objects by creating the hologram data 21D on the basis of the modified layer data.

In the information processing device 20, the modifying unit 23B modifies the boundary of the amplitude of the surrounding region of the occlusion region 213 in the layer data so as to be extended toward the inside of the occlusion region 213.

As a result, the information processing device 20 can suppress leakage of the wavefront from the boundary of the occlusion region 213 by extending the amplitude of the boundary of the occlusion region 213 in the layer data. As a result, the information processing device 20 can suppress the leakage of the wavefront from the boundary of the occlusion region 213 even when the hologram data 21D created on the basis of the modified layer data is reproduced.

In the information processing device 20, the modifying unit 23B modifies the amplitude of the layer data so as to fill the boundary region of the occlusion region 213 in the layer data.

As a result, since the information processing device 20 fills the vicinity of the boundary of the occlusion region 213 in the layer data and extends the amplitude of the boundary of the occlusion region 213, it is possible to suppress leakage of the wavefront from the boundary of the occlusion region 213. As a result, the information processing device 20 can suppress the leakage of the wavefront from the boundary of the occlusion region 213 even when the hologram data 21D created on the basis of the modified layer data is reproduced.

In the information processing device 20, the modifying unit 23B reduces the layer data having the occlusion region 213, modifies the boundary of the amplitude of the reduced layer data so as to be extended toward the inside of the occlusion region 213, and restores the size of the modified layer data.

As a result, the information processing device 20 extends the boundary of the amplitude of the reduced layer data and restores the size of the modified layer data, and thus it is possible to suppress the calculation amount and to suppress leakage of the wavefront from the boundary of the occlusion region 213. As a result, the information processing device 20 can suppress the leakage of the wavefront from the boundary of the occlusion region 213 even when the hologram data 21D created on the basis of the modified layer data is reproduced.

In the information processing device 20, the modifying unit 23B modifies the boundary of the amplitude of the surrounding region of the occlusion region 213 in the layer data so as to be smoothed.

As a result, the information processing device 20 smooths the boundary of the occlusion region 213, and thus it is possible to suppress leakage of the wavefront from the boundary of the occlusion region 213. As a result, the information processing device 20 can suppress the leakage of the wavefront from the boundary of the occlusion region 213 even when the hologram data 21D created on the basis of the modified layer data is reproduced.

In the information processing device 20, the modifying unit 23B modifies a boundary of the amplitude so as to be smoothed in a case where the amplitude distribution of the surrounding region in the vicinity of the boundary with the occlusion region 213 in the layer data is flat and, in a case where the amplitude distribution is not flat, modifies the boundary of the amplitude so as to be extended toward the inside of the occlusion region.

As a result, the information processing device 20 modifies the processing depending on the distribution of the amplitude in the vicinity of the boundary of the occlusion region 213 and extends the amplitude of the boundary of the occlusion region 213, and thus it is possible to suppress leakage of the wavefront from the boundary of the occlusion region 213 with a calculation amount suitable for the distribution of the amplitude. As a result, the information processing device 20 can suppress the leakage of the wavefront from the boundary of the occlusion region 213 even when the hologram data 21D created on the basis of the modified layer data is reproduced.

In the information processing device 20, the modifying unit 23B specifies the type of the occlusion region 213 and modifies the boundary of the amplitude by an extension method corresponding to the type.

As a result, the information processing device 20 extends the amplitude of the boundary of the occlusion region 213 by an extension method corresponding to the type of the occlusion region 213, and thus it is possible to suppress leakage of the wavefront from the boundary of the occlusion region 213 with a suitable calculation amount. As a result, the information processing device 20 can suppress the leakage of the wavefront from the boundary of the occlusion region 213 even when the hologram data 21D created on the basis of the modified layer data is reproduced.

In the information processing device 20, the occlusion region 213 has types of self-occlusion and mutual occlusion. In a case where the type of the occlusion region 213 is specified as self-occlusion, the modifying unit 23B projects the foreground image corresponding to the occlusion region 213 onto the occlusion region and modifies the boundary of the amplitude. In a case where the type of the occlusion region 213 is specified as mutual occlusion, the modifying unit 23B modifies the boundary of the amplitude so as to be extended toward the inside of the occlusion region 213.

As a result, the information processing device 20 extends the amplitude of the boundary of the occlusion region 213 by an extension method corresponding to the type of the occlusion region 213 of self-occlusion and mutual occlusion, and thus it is possible to suppress leakage of the wavefront from the boundary of the occlusion region 213 with a suitable calculation amount. As a result, the information processing device 20 can suppress the leakage of the wavefront from the boundary of the occlusion region 213 even when the hologram data 21D created on the basis of the modified layer data is reproduced.

In the information processing device 20, the modifying unit 23B modifies the phase of the boundary portion with the occlusion region 213 of the layer data so that the wavefront generated from the boundary between the occlusion region 213 and the surrounding region in the layer data does not spread into the occlusion region 213.

As a result, the information processing device 20 can suppress leakage of the wavefront from the boundary of the occlusion region 213 by modifying the phase to a phase that does not spread the wavefront from the boundary of the occlusion region 213 in the layer data into the occlusion region 213. As a result, the information processing device 20 can suppress the leakage of the wavefront from the boundary of the occlusion region 213 even when the hologram data 21D created on the basis of the modified layer data is reproduced.

In the information processing device 20, the modifying unit 23B modifies the phase of the boundary portion with the occlusion region of the layer data so as to diffuse the wavefront generated from the boundary between the occlusion region 213 and the surrounding region in the layer data.

As a result, the information processing device 20 modifies the phase of the boundary with the occlusion region 213 in the layer data to a phase that diffuses the wavefront, and thus it is possible to suppress leakage of the wavefront from the boundary of the occlusion region 213. That is, the information processing device 20 can suppress occurrence of speckle noise other than in the vicinity of the boundary of the occlusion region 213. As a result, even when the hologram data 21D created on the basis of the modified layer data is reproduced, the information processing device 20 can suppress occurrence of ringing at the boundary of the occlusion region 213 and speckle noise other than in the vicinity of the boundary.

The information processing device 20 includes: the object light generating unit 23 that generates layer data indicating the object light; the wavefront propagation calculating unit 24 that calculates wavefront propagation on the basis of the amplitude and the phase of the layer data; and the interference fringes generating unit 25 that generates interference fringes on the basis of a calculation result of the wavefront propagation, in which the object light generating unit 23 includes the specifying unit 23A and the modifying unit 23B.

As a result, since the information processing device 20 has extended the amplitude of the boundary of the occlusion region 213, it is possible to generate interference fringes of the hologram H in which leakage of the wavefront at the boundary of the occlusion region 213 is suppressed. As a result, the information processing device 20 can suppress leakage of the wavefront from the boundary of the occlusion region 213 even when the hologram data 21D having the generated interference fringes is reproduced.

An information processing method of the information processing device 20 includes: specifying an occlusion region 213 lost by a foreground image of layer data of another hierarchy from a plurality of pieces of layer data capable of expressing object light of a three-dimensional object in a stepwise manner; and modifying at least one of the amplitude or the phase in layer data of a boundary with the specified occlusion region 213 so as to suppress leakage of the object light to the outside of the occlusion region 213.

As a result, after specifying the occlusion region 213 in the layer data, the information processing method can modify the layer data so as to suppress leakage of the object light to the outside of the occlusion region 213. As a result, the information processing method can suppress occurrence of ringing in the hologram H having the anteroposterior relationship of objects by creating the hologram data 21D on the basis of the modified layer data.

An information processing program of the information processing device 20 causes a computer to execute the steps of: specifying, from a plurality of pieces of layer data capable of expressing object light of a three-dimensional object in a stepwise manner, an occlusion region 213 that is lost due to a foreground image of the layer data of another hierarchy; and modifying at least one of the amplitude or the phase in the layer data at a boundary with the occlusion region 213 that has been specified so that leakage of the object light to an outside of the occlusion region 213 is suppressed.

As a result, after specifying the occlusion region 213 in the layer data, the information processing program can cause the computer to modify the layer data so as to suppress leakage of the object light to the outside of the occlusion region 213. As a result, the information processing program can suppress occurrence of ringing in the hologram H having the anteroposterior relationship of objects by creating the hologram data 21D on the basis of the modified layer data.

Note that the following configurations also belong to the technical scope of the present disclosure.

(1)

An information processing device including:
a specifying unit that specifies, from a plurality of pieces of layer data capable of expressing object light of a three-dimensional object in a stepwise manner, an occlusion region that is lost due to a foreground image of one of the plurality of pieces of layer data of another hierarchy; and
a modifying unit that modifies at least one of an amplitude or a phase in one of the plurality of pieces of layer data at a boundary with the occlusion region that has been specified so that leakage of the object light to an outside of the occlusion region is suppressed.

(2)

The information processing device according to (1), wherein the modifying unit modifies a boundary of the amplitude of a surrounding region of the occlusion region in the one of the plurality of pieces of layer data so as to be extended toward an inside of the occlusion region.

(3)

The information processing device according to (1) or (2), wherein the modifying unit modifies the amplitude of the one of the plurality of pieces of layer data so as to fill a boundary region of the occlusion region in the one of the plurality of pieces of layer data.

(4)

The information processing device according to any one of (1) to (3),
wherein the modifying unit reduces the one of the plurality of pieces of layer data having the occlusion region, modifies a boundary of the amplitude of the reduced layer data so as to be extended toward an inside of the occlusion region, and restores a size of the modified layer data.

(5)

The information processing device according to any one of (1) to (4),
  wherein the modifying unit modifies a boundary of the amplitude of a surrounding region of the occlusion region in the one of the plurality of pieces of layer data so as to be smoothed.

(6)

The information processing device according to any one of (1) to (5),
  wherein the modifying unit modifies a boundary of the amplitude so as to be smoothed in a case where an amplitude distribution of a surrounding region in a vicinity of a boundary with the occlusion region in the one of the plurality of pieces of layer data is flat and, in a case where the amplitude distribution is not flat, modifies the boundary of the amplitude so as to be extended toward an inside of the occlusion region.

(7)

The information processing device according to any one of (1) to (6),
  wherein the modifying unit specifies a type of the occlusion region and modifies a boundary of the amplitude by an extension method corresponding to the type.

(8)

The information processing device according to (7),
  wherein the occlusion region has types of self-occlusion and mutual occlusion, and
  the modifying unit modifies a boundary of the amplitude by projecting the foreground image corresponding to the occlusion region onto the occlusion region in a case where a type of the occlusion region is specified as the self-occlusion and, in a case where the type of the occlusion region is specified as the mutual occlusion, modifies the boundary of the amplitude so as to be extended toward an inside of the occlusion region.

(9)

The information processing device according to any one of (1) to (8),
  wherein the modifying unit modifies a phase of a boundary portion with the occlusion region of the one of the plurality of pieces of layer data so that a wavefront generated from a boundary with a surrounding region of the occlusion region in the one of the plurality of pieces of layer data does not spread into the occlusion region.

(10)

The information processing device according to any one of (1) to (9),
  wherein the modifying unit modifies a phase of a boundary portion with the occlusion region of the one of the plurality of pieces of layer data so as to diffuse a wavefront generated from a boundary with a surrounding region of the occlusion region in the one of the plurality of pieces of layer data.

(11)

The information processing device according to any one of (1) to (10), further including:
  an object light generating unit that generates the plurality of pieces of layer data indicating the object light;
  a wavefront propagation calculating unit that calculates wavefront propagation on a basis of an amplitude and a phase of the plurality of pieces of layer data; and
  an interference fringes generating unit that generates interference fringes on a basis of a calculation result of the wavefront propagation,
  wherein the object light generating unit includes the specifying unit and the modifying unit.

(12)

An information processing method including the steps of:
  by a computer, specifying, from a plurality of pieces of layer data capable of expressing object light of a three-dimensional object in a stepwise manner, an occlusion region that is lost due to a foreground image of one of the plurality of pieces of layer data of another hierarchy; and
  modifying at least one of an amplitude or a phase in one of the plurality of pieces of layer data at a boundary with the occlusion region that has been specified so that leakage of the object light to an outside of the occlusion region is suppressed.

(13)

An information processing program for causing a computer to execute the steps of:
  specifying, from a plurality of pieces of layer data capable of expressing object light of a three-dimensional object in a stepwise manner, an occlusion region that is lost due to a foreground image of one of the plurality of pieces of layer data of another hierarchy; and
  modifying at least one of an amplitude or a phase in one of the plurality of pieces of layer data at a boundary with the occlusion region that has been specified so that leakage of the object light to an outside of the occlusion region is suppressed.

(14)

A computer-readable recording medium storing an information processing program for causing a computer to execute the steps of:
  specifying, from a plurality of pieces of layer data capable of expressing object light of a three-dimensional object in a stepwise manner, an occlusion region that is lost due to a foreground image of one of the plurality of pieces of layer data of another hierarchy; and
  modifying at least one of an amplitude or a phase in one of the plurality of pieces of layer data at a boundary with the occlusion region that has been specified so that leakage of the object light to an outside of the occlusion region is suppressed.

REFERENCE SIGNS LIST

1 INFORMATION PROCESSING SYSTEM
10 HOLOGRAM DISPLAY UNIT
11 DISPLAY MEDIUM
12 LIGHT SOURCE
20 INFORMATION PROCESSING DEVICE
21 STORAGE UNIT
21A IMAGE DATA
21B OBJECT LIGHT DATA
21C WAVEFRONT DATA
21D HOLOGRAM DATA
22 CONTROL UNIT
23 OBJECT LIGHT GENERATING UNIT
23A SPECIFYING UNIT
23B MODIFYING UNIT
24 WAVEFRONT PROPAGATION CALCULATING UNIT
25 INTERFERENCE FRINGES GENERATING UNIT
211 FOREGROUND
212 BACKGROUND

213 OCCLUSION REGION
H HOLOGRAM
H1 HOLOGRAM SURFACE

The invention claimed is:

1. An information processing device comprising:
circuitry configured to
specify an occlusion region from a plurality of pieces of layer data capable of expressing object light of a three-dimensional object in a stepwise manner, wherein
the plurality of pieces of layer data includes background layer data and foreground layer data representing a background image and a foreground image respectively, and
the occlusion region is a partial region of the background layer data corresponding to the foreground image, and
extend an amplitude of the background layer data toward an inside of the occlusion region to fill a boundary of the occlusion region,
wherein the extension of the amplitude of the background layer data includes:
shrinking the background layer data;
extending an amplitude of the shrunk background layer data toward the inside of the occlusion region; and
enlarging the shrunk background layer data having the extended amplitude to restore a reduced size of the background layer data due to the shrinking.

2. The information processing device according to claim 1,
wherein the circuitry is further configured to smooth the amplitude of the background layer data corresponding to a vicinity of the boundary of the occlusion region in a case where an amplitude distribution corresponding to the vicinity of the boundary of the occlusion region is flat.

3. The information processing device according to claim 1,
wherein the circuitry is further configured to:
determine whether the occlusion region includes at least one of self-occlusion or mutual occlusion, wherein
the self-occlusion is caused among parts of a single object, and
the mutual occlusion is caused among a plurality of objects; and
modify the amplitude of the background layer data corresponding to the vicinity of the boundary of the occlusion region by:
projecting the foreground layer data onto the occlusion region in accordance with determination that the occlusion region includes the self-occlusion; and
extending the amplitude of the background layer data toward the inside of the occlusion region in accordance with the determination that the occlusion region includes the mutual occlusion.

4. An information processing device comprising:
circuitry configured to
specify an occlusion region from a plurality of pieces of layer data capable of expressing object light of a three-dimensional object in a stepwise manner, wherein
the plurality of pieces of layer data includes background layer data and foreground layer data representing a background image and a foreground image respectively, and
the occlusion region is a partial region of the background layer data corresponding to the foreground image, and
modify a phase of the background layer data corresponding to a boundary of the occlusion region to prevent a wavefront propagated from the boundary of the occlusion region from spreading into the occlusion region.

5. The information processing device according to claim 4,
wherein the circuitry is further configured to modify the phase of the background layer data to have a random phase to diffuse the wavefront.

6. An information processing device comprising:
circuitry configured to
specify an occlusion region from a plurality of pieces of layer data capable of expressing object light of a three-dimensional object in a stepwise manner, wherein
the plurality of pieces of layer data includes background layer data and foreground layer data representing a background image and a foreground image respectively, and
the occlusion region is a partial region of the background layer data corresponding to the foreground image, and
extend an amplitude of the background layer data toward an inside of the occlusion region to fill a boundary of the occlusion region,
wherein the circuitry is further configured to:
generate the plurality of pieces of layer data indicating the object light;
calculate wavefront propagation on a basis of an amplitude and a phase of the plurality of pieces of layer data; and
generate interference fringes on a basis of a calculation result of the wavefront propagation.

7. An information processing method comprising:
acquiring a plurality of pieces of layer data capable of expressing object light of a three-dimensional object in a stepwise manner, wherein the plurality of pieces of layer data includes background layer data and foreground layer data representing a background image and a foreground image respectively;
specifying an occlusion region from the plurality of pieces of layer data, wherein the occlusion region is a partial region of the background layer data corresponding to the foreground image; and
extending an amplitude of the background layer data toward an inside of the occlusion region to fill a boundary of the occlusion region;
wherein extending the amplitude of the background layer data includes:
shrinking the background layer data;
extending an amplitude of the shrunk background layer data toward the inside of the occlusion region; and
enlarging the shrunk background layer data having the extended amplitude to restore a reduced size of the background layer data due to the shrinking.

* * * * *